US010127675B2

(12) United States Patent
Chefd'hotel et al.

(10) Patent No.: US 10,127,675 B2
(45) Date of Patent: Nov. 13, 2018

(54) EDGE-BASED LOCAL ADAPTIVE THRESHOLDING SYSTEM AND METHODS FOR FOREGROUND DETECTION

(71) Applicant: Ventana Medical Systems, Inc., Tucson, AZ (US)

(72) Inventors: Christophe Chefd'hotel, Sunnyvale, CA (US); Srinivas Chukka, San Jose, CA (US); Xiuzhong Wang, San Jose, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 20 days.

(21) Appl. No.: 15/387,638

(22) Filed: Dec. 21, 2016

(65) Prior Publication Data
US 2017/0098310 A1     Apr. 6, 2017

Related U.S. Application Data

(63) Continuation of application No. PCT/EP2015/064845, filed on Jun. 30, 2015.
(Continued)

(51) Int. Cl.
*G06T 7/12*      (2017.01)
*G06T 7/194*     (2017.01)
(Continued)

(52) U.S. Cl.
CPC .............. *G06T 7/12* (2017.01); *G06T 7/0012* (2013.01); *G06T 7/13* (2017.01); *G06T 7/136* (2017.01);
(Continued)

(58) Field of Classification Search
CPC .. G06T 7/12; G06T 7/13; G06T 7/194; G06T 7/136; G06T 7/0012; G06T 2207/10024;
(Continued)

(56) References Cited

U.S. PATENT DOCUMENTS

2009/0034816 A1 *   2/2009   Ghanem ............... G06T 7/0012
                                                     382/131
2015/0324998 A1 *  11/2015   Song ..................... G06T 3/40
                                                     382/171

OTHER PUBLICATIONS

Canny, John, A Computational Approach to Edge Detection, IEEE Transactions on Pattern Analysis and Machine Intelligence, Nov. 1986, pp. 679-698, vol. 8, No. 6.
(Continued)

*Primary Examiner* — Kenny Cese
(74) *Attorney, Agent, or Firm* — Ventana Medical Systems, Inc.

(57) ABSTRACT

Systems and methods for generating a locally adaptive threshold image for foreground detection performing operations including creating a saliency edge strength image or layer indicating edge or border pixels of the nuclei by performing tensor voting on pixels neighboring the initial edge pixels within an image region to refine true edges are featured. Further, for each of a plurality of regions or blocks of the image, an adaptive threshold image is determined by sampling a foreground pixel and a background pixel for each initial edge pixel or refined edge pixel, generating histograms for both background and foreground saliency (or gradient magnitude) modulated histograms, determining a threshold range for each block of the image, and interpolating the threshold at each pixel based on the threshold range at each block. Comparing the input image with the resulting locally adaptive threshold image enables extraction of significantly improved foreground.

20 Claims, 11 Drawing Sheets
(4 of 11 Drawing Sheet(s) Filed in Color)

Related U.S. Application Data

(60) Provisional application No. 62/018,848, filed on Jun. 30, 2014.

(51) Int. Cl.
  *G06T 7/136* (2017.01)
  *G06T 7/00* (2017.01)
  *G06T 7/13* (2017.01)
  *G06K 9/46* (2006.01)

(52) U.S. Cl.
  CPC ............ *G06T 7/194* (2017.01); *G06K 9/4604* (2013.01); *G06T 2207/10024* (2013.01); *G06T 2207/10056* (2013.01); *G06T 2207/20021* (2013.01); *G06T 2207/20076* (2013.01); *G06T 2207/20164* (2013.01); *G06T 2207/30024* (2013.01)

(58) Field of Classification Search
  CPC  G06T 2207/20164; G06T 2207/30024; G06K 9/4604
  See application file for complete search history.

(56) References Cited

OTHER PUBLICATIONS

Chang et al, Segmentation of heterogeneous blob objects through voting and level set formulation, Pattern Recognition Letters, Jul. 2007, pp. 1781-1787, vol. 28, No. 13.

Cousty et al, Watershed Cuts: Minimum Spanning Forests and the Drop of Water Principle, IEEE Transactions on Pattern Analysis and Machine Intelligence, 2009, pp. 1362-1374, vol. 31, No. 8.

Duda et al, Use of the Hough Transformation to Detect Lines and Curves in Pictures, Communications of the ACM, Jan. 1972, pp. 11-15, vol. 15, No. 1.

Guy et al, Inferring Global Perceptual Contours from Local Features, International Journal of Computer Vision, 1996, pp. 113-133, vol. 20.

International Search Report and Written Opinion dated Dec. 17, 2015 in corresponding PCT/EP2015/064845 filed Jun. 30, 2015, pp. 1-17.

Kobatake et al, Convergence Index Filter for Vector Fields, IEEE Transactions on Medical Imaging, Aug. 1999, pp. 1029-1038, vol. 8, No. 8.

Loss et al, An iterative multi-scale tensor voting scheme for perceptual grouping of natural shapes in cluttered backgrounds, Computer Vision and Image Understanding, 2009, pp. 126-149, vol. 113.

Loy et al, Fast Radial Symmetry for Detecting Points of Interest, IEEE Transactions on Pattern Analysis and Machine Intelligence, Aug. 2003, pp. 959-973, vol. 25, No. 8.

Michelin et al, Embryo cell membranes reconstruction by tensor voting, IEEE 11th International Symposium on Biomedical Imaging, Apr. 29, 2014, pp. 1259-1262, N/A.

Najman et al, Geodesic Saliency of Watershed Countours and Hierarchical Segmentation, IEEE Transactions on Pattern Analysis and Machine Intelligence, Dec. 1996, pp. 1163-1173, vol. 18, No. 12.

Parvin et al, Iterative Voting for Inference of Structural Saliency and Characterization of Subcellular Events, IEEE Transactions on Image Processing, Mar. 1, 2007, pp. 615-623, vol. 16, No. 3.

Rosenfeld et al, Distance Functions on Digital Pictures, Pattern Recognition, 1968, pp. 33-61, vol. 1.

Sezgin et al, Survey over image thresholding techniques and quantitative performance evaluation, Journal of Electronic Imaging, Jan. 2004, pp. 146-165, vol. 13, No. 1.

Vincent et al, Watersheds in Digital Spaces: An Efficient Algorithm Based on Immersion Simulations, IEEE Transactions on Pattern Analysis and Machine Intelligence, Jun. 1991, pp. 583-598, vol. 13, No. 6.

Yang et al, Localization of Saliency through Iterative Voting, Proceedings of the 17th International Conference on Pattern Recognition, Aug. 23, 2004, pp. 63-66, vol. 1, No. 23.

\* cited by examiner

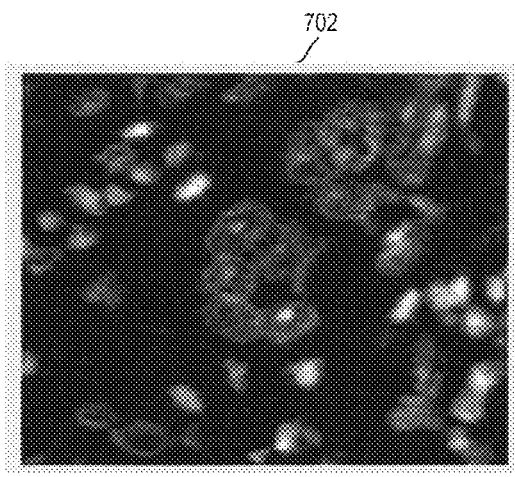 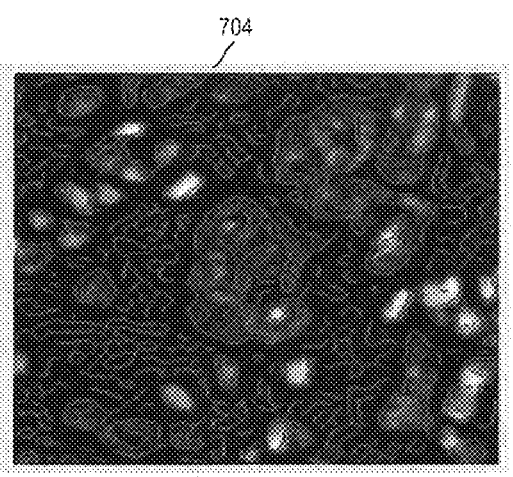
FIG. 7A — original image
FIG. 7B — initial edge detection image saliency image refined edge image saliency edge strength image

EDGE-BASED LOCAL ADAPTIVE THRESHOLDING SYSTEM AND METHODS FOR FOREGROUND DETECTION

CROSS-REFERENCE TO RELATED APPLICATIONS

This patent application is a continuation of International Patent Application No. PCT/EP2015/064845 filed Jun. 30, 2015, which claims priority to and the benefit of U.S. Provisional Application No. 62/018,848, filed Jun. 30, 2014. Each of the above patent applications is incorporated herein by reference as if set forth in its entirety.

FIELD OF THE SUBJECT DISCLOSURE

The present subject disclosure relates to digital pathology. More particularly, the present subject disclosure relates to thresholding methods for nucleus segmentation in digital pathology.

BACKGROUND OF THE SUBJECT DISCLOSURE

Nucleus segmentation is a key component for many digital pathology applications. A great deal of effort has been made to extract the mask of nuclei or cells from an image comprising of these structures, which is essential for the efficient characterization of these structures. A popular nucleus segmentation framework starts with foreground detection of isolated nuclei and nucleus clusters based on global or local thresholding methods [1]. The nucleus clusters are then divided into several nuclei using a type of watershed transform [2,3,4], such as a competitive region growing process for dividing the cluster into plausible subregions, utilizing nucleus seeds generated by the distance transform [8] or a type of radial symmetry transform [5,6], or a type of Hough transform [7], etc. Usually, when the foreground delineation is accurate, the separation of clustered nuclei is plausible. Existing thresholding methods for foreground detection rely on the assumption that the foreground (i.e., the isolated nuclei or nucleus clusters) is consistently brighter (or darker) than the background (i.e., the empty area or unspecific staining area), locally and/or globally. However, in reality, the intensity of the nuclei and nuclei clusters varies a great deal across the same image (or field of view). For instance, unspecific stains in the image may have the same intensity level as isolated nuclei and nucleus clusters. Prior techniques primarily utilize edge detection filters and/or intensity statistics based thresholding; and that was not completely effective because of varying tissue density and staining. See, for example, M. Sezgin and B. Sankur, "Survey over image thresholding techniques and quantitative performance evaluation", Journal of Electronic Imaging, Vol. 13, No. 1, pp. 146-165, 2004; L. Vincent and P. Soille, "Watersheds in digital spaces: an efficient algorithm based on immersion simulations", IEEE Transactions on Pattern Analysis and Machine Intelligence, Vol. 13, No. 6, pp. 583-598, 1991; L. Najman and M. Schmitt, "Geodesic saliency of watershed contours and hierarchical segmentation", IEEE Transactions on Pattern Analysis and Machine Intelligence, Vol. 18, No. 12, pages 1163-1173, 1996; J. Cousty, G. Bertrand, L. Najman, and M. Couprie, "Watershed Cuts: Minimum Spanning Forests and the Drop of Water Principle", IEEE Transactions on Pattern Analysis and Machine Intelligence. Vol. 31, No. 8, pp. 1362-1374, 2009; Hidefumi Kobatake and Shigeru Hashimoto, "Convergence Index Filter for Vector Fields", IEEE Transactions on Medical Imaging, Vol. 8, No. 8, pp. 1029-1038, August 1999; Bahram Parvin, Qing Yang, Ju Han, Hang Chang, Bjorn Rydberg and Mary Helen Barcellos-Hoff, "Iterative Voting for Inference of Structural Saliency and Characterization of Subcellular Events", IEEE Transactions on Image Processing, Vol. 16, No. 3, pp. 615-623, March 2007; Duda, R. O. and P. E. Hart, "Use of the Hough Transformation to Detect Lines and Curves in Pictures," Comm. ACM, Vol. 15, pp. 11-15, 1959; J. Canny, "A computational approach to edge detection", IEEE Trans. Pattern Analysis and Machine Intelligence, Vol. 8, No. 6, pp. 679-698, 1986; G. Guy and G. Medioni, "Inferring global perceptual contours from local features," in International Journal of Computer Vision, 1996, vol. 20, pp. 113-133; L. A. Loss, G. Bebis, M. Nicolescu, A. Skurikhin, "An iterative multi-scale tensor voting scheme for perceptual grouping of natural shapes in cluttered backgrounds," in Computer Vision and Image Understanding, 2009, vol. 113, pp. 126-149.

REFERENCES

[1]: M. Sezgin and B. Sankur: "Survey over image thresholding techniques and quantitiative performance evaluation", Journal Electronic Imaging, Vol. 13(1), pp. 146-165, 2004

[2]: Luc Vincent and Pierre Soille: "Watersheds in Digital Spaces: An Efficient Algorithm Based on Immersion Simulations", IEEE TRANSACTIONS ON PATTERN ANALYSIS AND MACHINE INTELLIGENCE, VOL. 13, NO 6, June 1991

[3]: Laurent Najman and Michel Schmitt: "Geodesic Saliency of Watershed Contours and Hierarchical Segmentation", IEEE TRANSACTIONS ON PATTERN ANALYSIS AND MACHINE INTELLIGENCE; VOL. 18, NO 12, DECEMBER 1996

[4]: Jean Cousty, Gilles Bertrand, Laurent Najman and Michel Couprie: "Watershed cuts: minimum spanning forests and the drop of water principle", SUBMITTED TO IEEE PAMI, 2007, REVISED 2008

[5]: H. Kobatake and S. Hashimoto, "Convergence index filter for vector fields", IEEE Transactions on Medical Imaging, Vol. 8(8), pp. 1029-1038, 1999

[6]: G. Loy and A. Zelinsky, "Fast radial symmetry for detecting points of interest", IEEE Transactions on Pattern Analysis and Machine Intelligence, Vol 25(8), pp. 959-973, 2003

[7]: Richardt O. Duda and Peter E. Hart: "Use of the Hough Transformation To Detect Lines and Curves in Pictures", Graphics and Image Processing, Editor: W. Newman, 1972, p. 11-15

[8]: A. RosenFeld and J. Pfaltz, "Distance functions in digital pictures", Pattern Recognition, Vol. 1, pp. 33-61, 1968.

SUMMARY OF THE SUBJECT DISCLOSURE

The present invention is surprisingly effective for determining the boundaries of cell nuclei in digital pathology applications. Whereas prior art techniques recover only about 60% of the nuclei present in an image, the techniques of this invention may recover more than 90%.

In one embodiment of the invention, the techniques of prior art may serve as a starting point for edge detection. The invention then refines this initial estimate by accumulating tensor votes to produce a saliency edge image, also referred to as "saliency image" which is then used to provide refined estimates of the edges present in the image. The identified edges may be further refined via hysteresis thresholding and multi-response suppression.

The term "saliency" as used herein is a measure for the confidence or probability that a particular pixel is part of an edge which represents the outline of a particular cell nucleus.

Another embodiment of the invention may extend this method by using the refined edge image as an edge mask, and the saliency edge image as a weighting image, to form histograms of weighted original image pixels in small regions ("blocks") surrounding edge pixels to generate a foreground histogram and a background histogram. An "optimal threshold level", also referred to as "optimized threshold value", for use on the edges in that region of the original image may be obtained by choosing an intensity level ("intensity threshold value") between the histogram modes which minimizes classification errors of the foreground and background pixel samples.

This may have the advantage that the saliency edge image may be calculated once but used twice for improving the accuracy of the local threshold. Thus, with comparatively limited computational effort a great improvement of accuracy may be achieved.

A mask can be, for example, an image consisting of one bit per pixel. Some areas of the mask having a particular bit, e.g. "0", are considered as masking bits and may be used for hiding, deleting or suppressing intensity values of pixels of other images onto which the mask is mapped. For example, using a thresholded saliency edge image as an edge mask may imply generating a mask in which all pixels whose saliency value is below a minimum value are represented as mask pixels which can be overlaid on the initial image 702 to filter out background noise signals.

In yet another embodiment, the aforementioned histogram technique may be applied to tiled sub regions ("blocks") of the image, and edge threshold levels usable for identifying the border between the interior and exterior regions of a nucleus may be determined as smooth interpolates of thresholds found in adjoining tiles ("blocks").

Other refinements of the invention may incorporate band-limited steerable filter theory into the tensor voting operations so that dense voting sets may be handled more quickly and efficiently by a computer through the use of fast Fourier transformation (FFT) processing to perform the implied vector convolutions. See "*An Efficient Method for Tensor Voting Using Steerable Filters*", Erik Franken et al, Techniche Universiteit Eindhoven.

Yet further refinements to the invention may incorporate domain specific knowledge about the image objects to tune or constrain the tensor voting fields to account for object asymmetries or preferred boundary directions or shapes. An example from the field of digital pathology where examinations of cell nuclei may be a preference for closed almost-circular regions with higher image intensity in the nuclear interior compared to pixels outside of the nuclear boundary. Such preferences might be incorporated into the tensor voting fields through a preferred asymmetry.

Thus, the voting process controlled by the tensor voting field will, according to embodiments, cast votes in the direction of the interior of a (suspected) nucleus which may be higher than the vote cast by said pixel in opposite direction (i.e., in the direction of the suspected nucleus' exterior). The suspicion, in which direction the interior of a nucleus resides, can be derived, for example, from the intensity gradient of the pixel casting the vote. Thus, the voting process according to embodiments of the invention is not symmetric at least in respect to neighboring pixels having the same distance from the voting pixels but lying in opposite directions in respect to the direction given by the intensity gradient of the voting pixel. This asymmetry thus incorporates features of the type of nuclei to be identified. For example, multiple reference tissues may be labeled with a particular biomarker and/or a nucleus-specific stain and the typical radius or diameter of the type of nucleus to be determined may be determined empirically by measuring the average radius or diameter of the nuclei in the reference slides.

Medioni has developed a mathematical technique for discerning salient image features, giving computers a sense of psychological Gestalt, so that lines, curves, shapes, etc., can be discerned in images despite the presence of interfering noise, obscured border pixels, overlapping shapes, etc. "*Tensor Voting: Theory and Applications*", Gerard Medioni et al, Institute for Robotics and Intelligent Systems, USC. His methods are based on a description of the image in terms of tensor values at each pixel of the image. Tensors describe the general qualities of an image at each pixel location. For two-dimensional images, the tensor properties of ball-like and stick-like apply at each pixel in varying degrees. Pixels which lie along some boundary curve possess stick-like character, where the stick may indicate a tangent or normal to the boundary and its length may indicate a sense of firmness in the belief that the pixel belongs to the boundary. Isolated pixels that do not seem to belong to any boundary may be described as ball-like, meaning that they have little sense of direction and membership in a boundary.

According to embodiments, each pixel of an initial digital image is represented as a tensor comprising a stick-like component, also referred to as "stick-like tensor value", and a ball-like component, also referred to as "ball-like tensor value". According to embodiments, the "amount" (or "weight") of a vote cast by a voting pixel onto a votee pixel (the pixel in the neighborhood of the voting pixel for which multiple votes are summed up to get a summarized vote) declines with distance between the two pixels. In addition, the "amount" of the vote cast by the voting pixel onto the votee pixel declines with the deviation of an implied curvature of a curve connecting the voting pixel and the votee pixel with the reference curvature. The reference curvature may be the curvature typical for the type of nucleus that is to be identified. The arc connecting the voting pixel and the votee pixel may be the segment curve of a perfect circle, and any deviation of the curvature of said arc from the typical curvature of the type of nucleus to be identified may result in a decline of the vote cast from the voting pixel on the votee pixel.

By defining stick-like tensor values at every pixel believed to make up a boundary, the membership of neighboring pixels to the boundary may be decided on the basis of votes cast by pixels with stick-like tensor values. But the votes fall away with distance and implied curvature of possible curves between the pixel at the voting site and the voting pixels. Votes are accumulated through tensor sums at the pixel, and the result produces another tensor with eigenvalues that imply levels of stick-like and ball-like attributes. By taking the stick-like attribute, we can form a saliency edge image which will tend to highlight the presence of bounding curves from the original image. That saliency edge image can be used to develop an improved edge mask (a "refined edge image") on the original image.

Medioni's interest in this topic was aimed at machine vision, discernment of rectilinear boundaries in scenes, and for reconstruction of 3-D objects from noisy images. Machine vision is typically applied to robotic factory assembly work, and autonomous vehicle guidance. The interest of the present invention in these techniques is very different and leads to variations on this method aimed at digital pathology applications, notably discerning cell nuclei in stained tissue slide images.

The subject disclosure presents systems and methods for generating a locally adaptive threshold image for detecting foreground features, including isolated nuclei and nucleus clusters. Systems, methods, and computer programs described herein perform operations including creating a saliency edge image comprising a two-dimensional array of float point numbers, in which a high intensity value indicates a high probability of the pixel being on the edge of a nucleus or a nucleus cluster. Generating the saliency edge image is enabled by performing tensor voting on neighboring pixels nearby selected pixels ("initial edge pixels" which are used as "initial voting pixels") to determine salient edge pixels. The resulting saliency edge image is more effective than the prior art as an indicator of whether or not a pixel is a nucleus edge pixel. "Salient edge pixels" may be edge pixels having been identified/predicted to belong to the outline of a nucleus, whereby tensor-generated saliency information is used for identifying the "salient edge pixels". The saliency edge image may be an image wherein salient edge pixels are highlighted. For example, the intensity values of pixels in the saliency edge image could correlate with the probability—given the tensor value being the sum of the votes having been cast on said pixel—that said pixel is an edge pixel of a nucleus or a nucleus cluster.

The saliency edge image is then used to generate refined edges by multi-response suppression and hysteresis thresholding. Given the refined edges, the initial digital image may be divided into a plurality of blocks, and for each of the plurality of blocks, foreground and background pixels along the image gradient direction at each edge pixel (e.g. of the refined edge) may be sampled, based on which the histogram for background pixels and that for foreground pixels can be generated. We call them saliency-modulated histograms because each foreground pixel is weighted by the saliency value of the edge pixel used as a starting point for sampling the foreground and background pixels.

In digital images, isolated nuclei or nucleus clusters typically are brighter (i.e., have higher intensity values) than non-nucleus pixels. Non-nucleus pixels may represent empty areas of the slide or an unspecific staining area. Depending on the staining, labeling and/or tissue preparation approach, it may also be the other way round and nuclear pixels are consistently darker than non-nucleus pixels. A "foreground pixel" is a pixel predicted/suspected to lie within a nucleus. A "background pixel" is a pixel predicted/expected not to lie within a nucleus. Embodiments of the invention use a combination of two classification approaches for classifying a pixel as a foreground or a background pixel: a first classification approach comprises selecting pixels in the vicinity of an edge pixel in a sampling step, whereby the direction of the gradient of said edge pixel and the position of the selected pixels relative to the gradient determine the result of the classification of said selected pixels. A second classification approach comprises classifying pixels whose intensity values are above or below a given intensity threshold value into two different pixel classes, foreground and background. The two approaches may be combined by executing the second classification approach multiple times with different threshold values until an optimized intensity threshold value is identified which minimizes the "error" (the deviation) between the threshold-based foreground and background pixel sets to the foreground and background pixel sets identified via the first approach.

According to embodiments, the sampling of foreground and background pixels according to the first approach and the identification of the optimized intensity threshold is performed for each block in a plurality of blocks within the initial digital image separately.

According to embodiments, the threshold range for each block of the image is determined by minimizing the error for background and foreground pixel classification based on both foreground and background histograms. The threshold at each pixel is obtained by interpolation based on the threshold range at each block, with the threshold range being assumed at the center of the block, or the center of all the edge pixels in the block. The result is a locally adaptive threshold image, for whose generation the intensity at each pixel may be compared with the threshold having been interpolated for the corresponding pixel of the source or input image. Comparing the source image with the locally adaptive threshold image provides a much more robust and accurate foreground.

In one exemplary embodiment, the subject disclosure is a non-transitory computer-readable medium for storing computer-executable instructions that are executed by a processor to perform operations including performing tensor voting operations on pixels in a neighborhood of each initial voting pixel, accumulating a plurality of votes at each pixel to determine a saliency value for each pixel, and generating a saliency edge strength image that highlights the edge pixels. In some embodiments, the tensor voting operations may use nonsymmetric tensor voting fields incorporating the domain knowledge about the structure to be detected, not limited to the size of the nucleus and the fact that the gradients on the edge point to approximately the same position.

In another exemplary embodiment, the subject disclosure is a tangible, non-transitory computer-readable medium having computer-executable instructions for performing delineation of object boundaries that are executed by a processing system to perform operations that may include reading an initial image, filtering the initial image with an edge detection filter to produce an initial edge image, selecting a plurality of pixels in the initial edge image to serve as initial voting pixels (IVPs), tokenizing the IVPs to produce tensor element tokens for each IVP, forming a weighted tensor voting field (WTVF) for each IVP aligned to the IVP tensor implied by the tensor element tokens for the IVP, performing tensor voting operations on neighboring pixels by accumulating a plurality of WTVFs from the IVPs into a tensor sum at each neighboring pixel, determining eigenvalues of the accumulated tensor sum at each pixel, generating a saliency edge strength image that highlights the edge pixels of the original image based on the eigenvalues at the pixel, and performing multi-response suppression on the salience edge image based on the major eigenvector and then hysteresis thresholding of the suppressed salience image to produce a refined edge mask.

An "initial voting pixels" (IVP) is a pixel that performs tensor voting on a plurality of other pixels in its neighborhood.

A "tensor value", also referred herein as "aggregated tensor value" or "tensor sum" is the result of an element-wise summation of multiple votes cast on a particular votee pixel. Each vote is a tensor. The tensor value may have the form of a 2×2 matrix.

An "intensity gradient", "image gradient" or "gradient vector" of a pixel is a data structure indicating a directional change in the intensity of pixels in an image, e.g. in an initial digital image. Image gradients may be used to extract information from images. For example, the gradient can be expressed by a data structure specifying a two-variable function, also referred to as the image intensity function, at each pixel in the image, whereby the two variables are the x (horizontal)- and y (vertical)-pixel coordinates of the image 702. A "gradient vector" or "intensity gradient vector" of a particular pixel is a 2D vector with the components given by the derivatives in the horizontal and vertical directions, whereby the gradient vector points in the direction of largest possible intensity increase, and the length of the gradient vector corresponds to the rate of change in that direction.

The creation of the saliency edge strength image based on the eigenvalues at the votee pixel may comprise comparing a first and a second eigenvalue for determining if the pixel is an edge pixel, a junction pixel or an outlier. In the saliency edge strength image, only refined edge pixels are highlighted. A "votee pixel" is the pixel receiving the votes of its neighbors (acting as "initial voting pixels"—IVPs). According to some embodiments, the highlighting of a pixel P comprises summing up all votes cast on said pixel P for calculating, using the tensor value resulting from the summarization, a saliency value. The saliency value of said pixel P indicates the likelyhood of pixel P being an edge pixel. The highlighting further comprises assigning the pixel P an intensity value that correlates with the saliency value. The assignment may be performed in an additional image, e.g. a saliency edge image.

The performing of the multi-response suppression on the salience edge image based on the major eigenvector may be performed in accordance with J. Canny, "A computational approach to edge detection", IEEE Trans. Pattern Analysis and Machine Intelligence, Vol. 8, No. 6, pp. 679-698, 1986. Thereby, a suppressed salience edge image is calculated. Further examples of multi-response suppression are known in the art.

According to embodiments, in a next step a hysteresis thresholding may be applied on the suppressed salience edge image to produce a refined edge image as depicted in FIG. 8B and from the refined edge image a refined edge mask. Using a hysteresis thresholding for edge detection comprises using two thresholds. Low thresholded edges which are connected to high thresholded edges are retained. Low thresholded edges which are not connected to high thresholded edges are removed. The hysteresis thresholding may be performed in accordance with J. Canny, "A computational approach to edge detection", IEEE Trans. Pattern Analysis and Machine Intelligence, Vol. 8, No. 6, pp. 679-698, 1986. Further examples of hysteresis thresholding are known in the art.

In some embodiments, the execution of these steps may be effective to produce delineation of object boundaries by detecting the salient boundaries that are obscured or fragmented in some regions of the initial image and that may also not be part of an edge in the initial edge image.

In other embodiments, the operations may further include generating a local histogram of foreground and background pixel intensity values from the initial image, weighted by the saliency value, over a neighborhood of each pixel of the refined edge mask, determining hysteresis edge detection thresholds from a statistical analysis of the local histogram, and applying the hysteresis edge detection thresholds to the initial image under the refined edge mask to determine object boundaries. These operations may be effective to refine the salient boundaries by making use of image characteristics along the boundaries. For example, the neighborhood of each pixel may consist of all pixels contained in the same block as said pixel. A plurality of non-overlapping pixel blocks may automatically be determined in the initial image, e.g. as a grid of pixel blocks. The local histogram may comprise the information of a foreground histogram and a background histogram computed specifically for said block. One threshold may be the lowest intensity value of the pixels in the foreground histogram and the other threshold may be the highest intensity value of the pixel of the background histogram. Said two thresholds may be used as the hysteresis edge detection thresholds.

In still another exemplary embodiment, the subject disclosure is a system for digital pathology including a processor and a memory coupled to the processor, the memory to store computer-executable instructions that, when executed by the processor, cause the processor to perform operations comprising determining a threshold range for a plurality of image blocks (or "blocks") comprised by a digital image, generating an adaptive threshold image based on the threshold range for each of the plurality of image blocks, and extracting a foreground from the image based on the adaptive threshold image, wherein each image block comprises a plurality of edge pixels determined by a tensor voting operation.

In yet another exemplary embodiment, the subject disclosure is a method including generating a non-symmetric voting field to determine a true nucleus border within a region of an image, sampling a foreground pixel and a background pixel for each pixel on the true nucleus border based on initial edge points or saliency edge points, and the saliency edge direction or the gradient direction, generating saliency or gradient modulated background and foreground histograms for each region of the image, utilizing the foreground and background histograms to compute a threshold range for each region of the image, and generating a threshold image based on interpolation of a plurality of threshold ranges corresponding to a plurality of regions of the image.

In one aspect, the invention relates to an image processing system for digital pathology. The system comprises a processor and memory coupled to the processor. The memory stores a digital image of a biological tissue sample and computer-executable instructions that, when executed by the processor, cause the processor to perform operations for discerning a cell nucleus boundary in a digital image of a biological tissue sample. Said operations comprise:

identifying, by the processor, one or more initial edges in the digital image and using the pixels within the identified initial edges as initial voting pixels;

using, by the processor, a tensor voting field for performing tensor voting operations on pixels in a neighborhood of each of the initial voting pixels;

accumulating, by the processor, a plurality of votes for each of the neighboring pixels to determine a tensor value for said neighboring pixel, the amount of the vote indicating whether said neighboring pixel is likely to be an edge pixel of the same nucleus as the initial voting pixel, the tensor value being a sum of all votes cast by all initial voting pixels in whose neighborhood said neighboring pixels lies; and decomposing, by the processor, each of the determined tensor values for determining eigenvalues and eigenvectors of the decomposed tensor value;

evaluating, by the processor, the determined eigenvalues and eigenvectors for identifying refined edge pixels, the refined edge pixels representing the cell nucleus boundary; and generating, by the processor, a saliency edge strength image which selectively comprises the identified refined edge pixels representing the cell nucleus boundary.

Using tensor voting in the field of digital pathology may have the advantageous effect of providing a very accurate and computationally efficient method for detecting cell nuclei, e.g. for counting the cells or cancer subtyping, e.g. when using cells or nuclei stained with a suitable stain and/or biomarker.

According to embodiments, the tensor voting field is encoded with one or more features of the nucleus. The tensor voting field is a nonsymmetrical tensor voting field which is nonsymmetrical along an intensity gradient of the initial voting pixel whose vote is calculated. The features of the nucleus comprise the information whether the typical intensity values of inner-nucleus pixels of the type of nucleus to be determined is higher or lower than the typical intensity values of outer-nucleus pixel. The encoding is performed such that the calculation of a vote of an initial voting pixel by the tensor voting field comprises:

identifying, by the processor, a direction of an intensity gradient of the digital image at the initial voting pixel; and causing the voting operations to cast higher votes on a first neighboring pixel than on a second neighboring pixel, the first and second neighboring pixels lying equally far apart from the voting pixel, wherein the first neighboring pixel lies, according to the identified direction of the intensity gradient, in the direction of the inside of the nucleus; wherein the second neighboring pixel lies, according to the identified direction of the intensity gradient, in the direction of the outside of the nucleus.

The intensity of the pixels inside and outside of a nucleus may depend on the used nuclear stain and/or background stain and/or on the type of nucleus to be detected. For example, some stains and experimental settings may stain the inner of a nucleus such that the inner-nucleus pixels have a higher intensity then the outer-nucleus pixels. Some stains and experimental settings may have the opposite effect. According to embodiments, the information if a particular stain used for staining the nucleus in the digital image results in higher or lower intensity values of inner-nuclear pixels than of outer-nuclear pixels is used for identifying the direction of the intensity gradient, which is always chosen such that it points to the interior of the nucleus. Thus, information on the effect of a particular stain on a particular type of nucleus (derived e.g. from reference slides and corresponding digital images) is used for determining the direction of the intensity gradients and for computing tensor voting fields which cast higher votes on neighboring pixels lying in the direction of the interior of a supposed nucleus than on neighboring pixels lying in a direction pointing away from the interior of the supposed nucleus.

According to embodiments, the casting of the vote comprises:

identifying the voting angle θ for the one initial voting pixel and the one neighboring pixel, wherein the voting angle θ is the angle between a line and the direction perpendicular to the intensity gradient at the one initial voting pixel, the line connecting the initial voting pixel and the one neighboring pixel, the intensity gradient representing a gradient of intensity values of the digital image, the intensity gradient pointing in the direction of intensity values typical for the inner parts of the type of nucleus to be determined;

casting a zero vote on the one neighboring pixel unless the voting angle belongs to one of the following angle ranges:

$$\left[\frac{-\pi}{12}, \frac{\pi}{4}\right], \text{ or}$$

$$\left[\frac{3\pi}{4}, \pi\right], \text{ or}$$

$$\left[-\pi, -\frac{11\pi}{12}\right].$$

The angle ranges given above are only one out of many possible examples of angle ranges which are not symmetrical along the intensity gradient of a voting pixel used as the center of a unit circle.

According to embodiments, the evaluation of the determined eigenvalues and eigenvectors comprises determining whether the pixel for which the evaluated eigenvalues and eigenvectors was determined is an edge pixel, a junction pixel, or an outlier. This information is used for selectively highlighting the edge pixels in the saliency edge strength image.

According to embodiments the determined eigenvectors of each pixel comprise a first (major) eigenvector and a second (minor) eigenvector. The determined eigenvalues of said pixel comprise a first (major) eigenvalue and a second (minor) eigenvalue. The first eigenvalue is the eigenvalue of the first eigenvector and the second eigenvalue is the eigenvalue of the second eigenvector. The size of the difference between the first eigenvalue and the second eigenvalue correlates with a tensor stick component's contribution to the tensor value of the pixel. The size of the second eigenvalue correlates with a tensor ball component's contribution to the tensor value of the pixel. The determination whether the initial voting pixel is an edge pixel, a junction pixel, or an outlier comprises comparing the first and the second eigenvalues of said pixel. If the first eigenvalue is larger than the second eigenvalue and the second eigenvalue is approximately zero, the pixel is identified as an edge pixel. If the first eigenvalue is approximately of the same size as the second eigenvalue and the size of both eigenvalues is above a minimum size, the pixel is identified as a junction pixel. If the first and the second eigenvalues are both approximately zero, the pixel is identified as an outlier.

According to embodiments the tensor value determined for each pixel represents a saliency value for said pixel. The saliency value is proportional to the probability that said pixel is a member of a nuclear edge.

According to embodiments, the implementation of the tensor voting field comprises implementing a program logic which uses the tensor voting field for calculating each vote of one of the initial voting pixels for one of its neighboring pixels.

According to embodiments, the tensor voting field is encoded with one or more features of the nucleus. The feature information includes information whether the inner nucleus is brighter or darker than the outside. This information is used for inferring from said information whether an intensity gradient points to the inside or outside of a nucleus. According to embodiments, the features of the nucleus comprise the radius of the type of nucleus whose boundary is to be detected. For example, ranges of typical radii of the type of nucleus to be determined may be used for calculating curvature constraints of the tensor voting field which again have an impact on the votes cast by the tensor voting field that encodes the one or more nuclear features.

According to embodiments, multiple features of the nucleus, e.g. the typical radius, the direction of the intensity gradient which may be used as an indicator pointing in the direction of the inner parts of a supposed nucleus may modulate the tensor voting field and may have an impact on the weight of the vote cast on a particular neighboring pixel. Also, the fact that intensity gradients of edge pixels of a real nucleus approximately point to the same position may be one of the features of the type of nucleus to be detected which may modulate the tensor voting field.

According to embodiments, the calculation of each vote of one of the initial voting pixels for one of its neighboring pixels comprises:

Identifying an intensity gradient at the one initial voting pixel, the intensity gradient representing a gradient of intensity values of the digital image, the intensity gradient pointing in the direction of intensity values typical for the inner parts of the type of nucleus to be determined;

calculating an arc of a circle connecting the one initial voting pixel and the one of the neighboring pixels, the arc having a geometric center, the geometric center lying on a line whose direction is identical to the direction of the intensity gradient and lying on the half of said line to which the direction of the intensity gradient points;

reducing the amount of the vote cast on the one neighboring pixel in proportion of the distance of said one neighboring pixel to the initial voting pixel; and/or reducing the amount of the vote cast on the one neighboring pixel in case the curvature of the arc deviates from the typical edge curvature of the type of nucleus to be identified more than a predefined deviation threshold.

According to embodiments, the vote cast on the one neighboring pixel is zero in case the curvature of the arc is below a lower curvature threshold or is above an upper curvature threshold. For example, the lower curvature threshold $\mathcal{K}_{min}$ may depend on a maximum nuclear radius according to $$\mathcal{K}_{min} = \frac{1}{r_{max}},$$

wherein $r_{max}$ is the upper threshold of a radius of the type of nucleus to be identified. The upper curvature threshold $\mathcal{K}_{max}$ may depend on a minimum nuclear radius according to $$\mathcal{K}_{max} = \frac{1}{r_{min}},$$

wherein $r_{min}$ is the lower threshold of a radius of the type of nucleus to be identified.

According to embodiments, an individual vote (S) cast by one of the initial voting pixels for one of its neighboring pixels is calculated according to:

$$S(l, \theta, \sigma) = e^{\frac{s^2 + c\mathcal{K}^2}{\sigma^2}} \begin{bmatrix} -\sin(2\theta) \\ \cos(2\theta) \end{bmatrix} [-\sin(2\theta) \cos(2\theta)],$$

wherein l is the Euclidian distance between the one initial voting pixel and the one neighboring pixel;

wherein θ is the voting angle between a line and the direction perpendicular to the intensity gradient (318) at the one initial voting pixel (O, 316), the line connecting the initial voting pixel and the one neighboring pixel, the intensity gradient representing a gradient of intensity values of the digital image (702), the intensity gradient pointing in the direction of intensity values typical for the inner parts of the type of nucleus to be determined;

wherein s is calculated according to $$S = \frac{\theta l}{\sin \theta}$$

and represents the length of an arc (317), the arc connecting the one initial voting pixel and the one neighboring pixel, the arc being the arc of a circle having a geometrical center (C);

wherein $\mathcal{K}$ is the voting curvature calculated according to $$\mathcal{K} = \frac{2\sin(\theta)}{l}$$

and;

wherein σ is a scaling factor determining the decay rate of the amount of the vote cast by said one initial voting pixel, the amount of the vote declining in proportion of the distance of the one neighboring pixel from the one neighboring pixel.

According to embodiments, the operations further comprise:

using the refined edge pixels for sampling foreground pixels and background pixels, the foreground pixels being candidates for inner-nucleus pixels, the background pixels being candidates for outer-nucleus pixels, wherein the foreground and background pixels are sampled by selecting pixels of the digital image in the neighborhood of an identified refined edge pixel, wherein foreground pixels and background pixels are selected from different sides of the edge;

creating a foreground histogram for the intensity values of the sampled foreground pixels;

creating a background histogram for the intensity values of the sampled background pixels;

evaluating the foreground and background histograms for identifying an optimized intensity threshold value, the optimized intensity threshold value being an intensity threshold value that is capable to separate the sampled pixels in dependence on their intensity values being below or above the intensity threshold value into two separate sets of pixels such that said two separate sets of pixels have minimum deviation from the foreground and background pixel samples.

According to embodiments, the operations further comprise assigning a weight to each of the foreground image pixels and to each of the background image pixels. The weight is proportional to the saliency value of the identified refined edge pixel which lies in-between said sampled foreground and background pixel and from whose two sides the foreground pixel and background pixel were sampled. Alternatively, the weight is proportional to the size of the intensity gradient of the identified refined edge pixel which lies in-between said sampled foreground and background pixel and from whose two sides the foreground pixel and background pixel were sampled.

The optimized intensity threshold value is identified such that the optimized intensity threshold value it is capable to separate the sampled pixels in dependence on their intensity values being below or above the intensity threshold value and in dependence on the weights of the sampled pixels into two separate sets of pixels such that said two separate sets of pixels have minimum deviation from the foreground and background pixel samples.

According to embodiments, the using of the refined edge pixels for sampling foreground pixels and background pixels, comprises, for each of the refined edge pixels:
  identify the intensity gradient at said refined edge pixel, the intensity gradient pointing in the direction of intensity values typical for the inner parts of the type of nucleus to be determined;
  selecting a first pixel lying at a predefined distance from said refined edge pixel in direction of the identified intensity gradient as one of the sampled foreground pixels;
  selecting a second pixel lying at a predefined distance from said refined edge pixel in opposite direction of the identified intensity gradient as one of the sampled background pixels.

According to embodiments, the operations further comprise dividing the digital image into a plurality of sub-regions and performing the sampling of the foreground and background pixels and the determination of the optimized intensity threshold values for each of the plurality of sub-regions separately. A sub-region may have, for example, the form of disjoint pixel blocks, but other forms are also possible.

According to embodiments, the processor of the system interpolates the optimized intensity threshold values of the plurality of sub-regions at each pixel of the initial image and assigns each of said pixels its interpolated optimized intensity threshold value.

According to embodiments, the processor compares the intensity values of the pixels of the digital image with their respectively assigned interpolated optimized intensity threshold values and automatically generates a foreground image mask. The foreground image mask selectively masks and hides all pixels predicted not to lie within a nucleus to be identified. The prediction depends on whether the intensity value of a pixel is found to be below or above the interpolated intensity threshold assigned to said pixel. The processor then applies the foreground image mask on the digital image for removing or hiding all pixels of the digital image which are predicted not to lie within a nucleus.

According to embodiments, the processor of the image analysis system calculates, for each of a plurality of pre-defined angles (e.g. 0°, 2°, 4°, . . . ), in a single calculation step, a respective tensor voting field. Each of the calculated tensor voting fields incorporates information on the direction of the intensity gradient at each pixel of the image and incorporates the relative position of each of a plurality of neighboring pixels with regard to said pixel. Each calculated tensor voting field does not incorporate ("lacks") information on the intensity gradient magnitude of the pixels.

The tensor voting operations are performed after the calculation of the plurality of calculated tensor voting fields. The casting of a vote by one of the initial voting pixels on one of its neighboring pixels comprises:
  Identifying, for the one initial voting pixel, an IVP-gradient angle, the IVP-gradient angle being the angle between the x-axis of the image and the direction of the intensity gradient of the one initial voting pixel;
  Identifying the one of the plurality of calculated tensor voting fields having been calculated for an angle being identical to the identified IVP-gradient angle or being the most similar to the identified IVP-gradient angle;
  aligning the identified tensor voting field with the grid of the digital image; the aligning may be executed such that the center of the tensor field locates at the voting pixel and/or that the angle for which the tensor voting field was calculated is aligned with the identified IVP gradient angle;
  using the relative position of the one initial voting pixel and the one neighboring pixel incorporated in the identified tensor voting field for identifying the tensor value that is to be decomposed for calculating the vote.

Thus, the calculated tensor voting fields are pre-calculated tensor voting fields. The pre-calculated tensor voting fields incorporate information on the direction of the intensity gradients but do not incorporate the information about the magnitude of the intensity gradients of the respective pixels. This has the advantage that the pre-calculated tensor voting fields can be re-used for accelerating the calculation of the votes of a plurality of initial voting pixels whose gradient orientation corresponds to the angle of the precalculated tensor voting field. In an image, there are typically many pixels whose gradient direction is identical or very similar, but the gradient magnitude may vary significantly.

If the tensor voting fields are precomputed, the curvature and the arc length will not have to be re-calculated in the voting process. If the tensor voting fields are not precomputed, the curvature and the arc length will be calculated for each IVP-neighboring pixel pair.

By precalculating tensor voting fields for a particular angle that lacks/does not incorporate the gradient magnitude of an initial voting pixel, the time and CPU resource consumption during the actual vote calculation can be significantly decreased.

According to embodiments, using the identified tensor voting field for calculating the vote of the one initial voting pixel for the one neighboring pixel comprises:
  weighting, for said one initial voting pixel, the identified tensor voting field by the magnitude (or in general a monotonic function) of the intensity gradient of the one initial voting pixel; this can be done, for example, by multiplying the identified tensor voting field by the intensity gradient magnitude;
  using the identified and weighted tensor voting field for calculating the vote of the particular initial voting pixel for the particular neighbor pixel.

The use of tensor voting fields for calculating a vote can be performed, for example, in accordance with as such is known in the art (see references mentioned below citing papers of G. Guy and G. Medioni and G. Bebis, M. Nicolescu, A. Skurikhin). Thereby, according to embodiments, an asymmetric tensor voting field is used that incorporates information on one or more features of the type of nucleus to be detected. The pre-calculation of tensor voting fields selectively incorporating gradient direction information but not incorporating gradient magnitude information may accelerate the voting process. This is of particular relevance in the context of real-time image analysis of digital images derived from a plurality of tissue slides.

According to embodiments, the operations further comprise performing multi-response suppression on the saliency edge image and then hysteresis thresholding of the suppressed saliency edge image to produce a refined edge mask for the digital image.

According to some embodiments, the initial edges are identified by applying a Canny (edge detection) filter on the initial image.

According to embodiments, the operations further comprise calculating the tensor voting field by using a band-limited steerable filter implementation for tensor voting calculations, whereby the use of the band-limited steerable filter enables tensor voting convolutions to be performed with a fast Fourier transformation.

According to embodiments, the operations further comprise:
  computing an intensity gradient in the initial image at the location of each initial voting pixel; and
  analyzing the image gradients at the initial voting pixels to produce stick tensor components of the tensor value of each initial voting pixel, wherein the direction of the intensity gradient at a pixel is used as the direction of a stick tensor component at that pixel and wherein the gradient value of the intensity gradient at said pixel is used for the strength of the stick tensor component at that pixel.

According to embodiments, the initial image is a grayscale image.

According to embodiments, the initial image comprises a plurality of color channels.

According to embodiments, the operations further comprise extracting one color channel from the plurality of color channels using methods selected from a group consisting of color deconvolution, separation or unmixing.

In a further aspect, the invention relates to a method for automatically discerning a cell nucleus boundary in a digital image of a biological tissue sample. The method is executed by a processor of a digital pathology image analysis system. The method comprises:
  Identifying, by the processor, one or more initial edges in the digital image and using the pixels within the identified initial edges as initial voting pixels;
  Performing, by the processor, tensor voting operations on pixels in a neighborhood of each of the initial voting pixels;
  Accumulating, by the processor, a plurality of votes for each of the neighboring pixels to determine a tensor value for said neighboring pixel, the amount of the vote indicating whether said neighboring pixel is likely to be an edge pixel of the same nucleus as the initial voting pixel, the tensor value being a sum of all votes cast by all initial voting pixels in whose neighborhood said neighboring pixel lies; and
  decomposing, by the processor, each of the determined tensor values for determining eigenvalues and eigenvectors of the decomposed tensor value;
  evaluating, by the processor, the determined eigenvalues and eigenvectors for identifying refined edge pixels, the refined edge pixels representing the cell nucleus boundary; and
  generating, by the processor, a saliency edge strength image (806) which selectively comprises the identified refined edge pixels representing the cell nucleus boundary.

According to embodiments, the method comprises the operations and steps executed by embodiments of the digital pathology image analysis systems described herein.

In a further aspect, the invention relates to a tangible, non-transitory computer-readable medium having computer-executable instructions for execution by a processing system. The system may be a digital pathology image analysis system as described herein in respect to multiple different embodiments. The computer-executable instructions for performing delineation of object boundaries for imaging analysis of biological tissue samples, the computer-executable instructions, when executed, cause the processing system to perform the above described method.

BRIEF DESCRIPTION OF THE DRAWINGS

The patent or application file contains at least one drawing executed in color. Copies of this patent or patent application publication with color drawing(s) will be provided by the Office upon request and payment of the necessary.

FIGS. 7A and 7B illustrates an Input gray scale image and initial edge detected image respectively.

DETAILED DESCRIPTION OF THE SUBJECT DISCLOSURE

Figure 6:
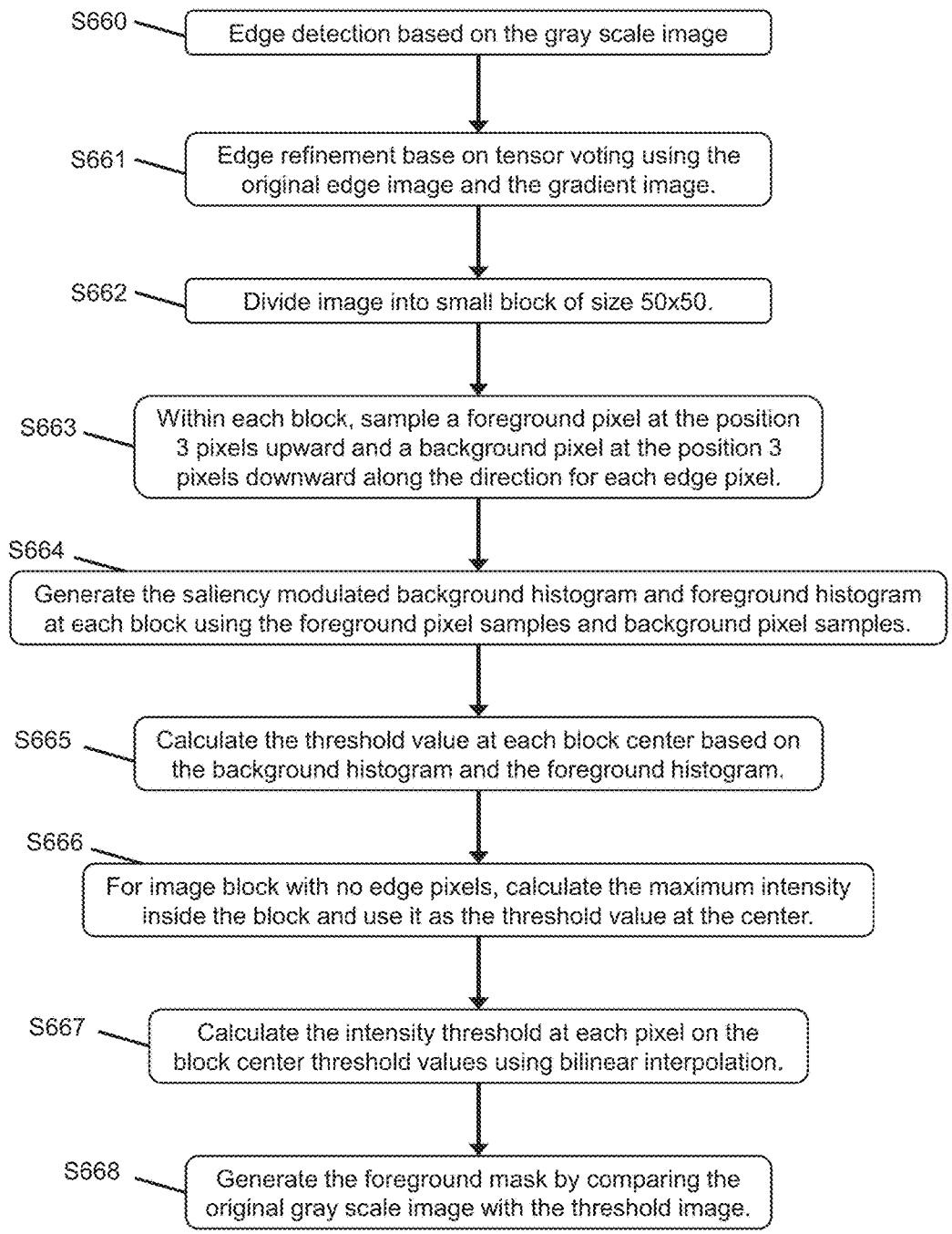
FIG. 6 illustrates a flowchart for foreground detection in accordance with the present invention.

Systems, methods, and computer programs described herein perform edge-based segmentation operations to, for example, identify nuclei. A method of foreground detection for nucleus segmentation, in accordance with the present invention, involves gradient-based edge detection; tensor voting; tensor field pre-computation; local histogram generations; and a threshold determination module to generate an image that results in improved nuclei detection, as shown in FIG. 7. FIG. 6 illustrates a flowchart for foreground detection in accordance with the present invention, and the steps shown in FIG. 6 are described in detail below.

Gradient Based Edge Detection

Generally, in an exemplary embodiment of a system in accordance with the present invention, an original/initial image 702 or set of image data is input into the system. After the system receives the original image or image data (as shown in FIG. 7A), a gradient-based edge detection module is utilized to detect edges of structures in the image (S660), for example, all structures or substantially all of the structures in the original/initial image. Gradient based edge detection methods are well known in the art.

In an exemplary embodiment of the present invention, the Canny edge detection method [8] is utilized to perform gradient-based edge detection for detecting, in the initial image 702, the edges depicted in the initial edge detection image 704. However, other gradient-based edge detection methods may be utilized. The image generated from the gradient-based edge detection module is the initial edge detection image 704, as shown in FIG. 7B. It is not uncommon for the edge detected from gradient-based edge detection modules known in the art to contain noise (e.g., artifacts coming from hair, air bubbles, dust, broken nucleus, etc.). As a result of the noise in the initial edge detection image, the method of detecting nuclei, in accordance with the present invention includes additional steps to enhance true nucleus edge pixels, and suppress non-nucleus edge pixels from the image.

Tensor Voting

After the initial edge detection image 704 is generated, tensor voting is performed on the initial edge image 704, for example on all or substantially all of the pixels in the initial edge image to generate a refined edge image 804 which is more sensitive and specific (S661). The tensor voting method involves, generally, determining (i.e., voting on), for pixels in the vicinity or a region around each of the initial edge pixels (of the initial edge image 704), whether each of the vicinity pixels (also referred to as "neighbor pixels") is likely to be an edge pixel of the same nucleus. While the concept of tensor voting is known in the art, the method of tensor voting of the present invention is designed, for example, such that pixels on the edge of the same nucleus vote for each other. The tensor voting process in the present invention is implemented using tensor voting fields. The tensor voting fields are designed to incorporate the prior information about nucleus size and shape, and image intensity distribution around the nucleus, which can be obtained by exploring representative images. This leads to non-symmetric tensor voting field, deviating from a normal application in the art. Examples for tensor voting schemes are given e.g. in G. Guy and G. Medioni, "Inferring global perceptual contours from local features," International Journal of Computer Vision, 1996, vol. 20, pp. 113-133, and in L. A. Loss, G. Bebis, M. Nicolescu, A. Skurikhin, "An iterative multi-scale tensor voting scheme for perceptual grouping of natural shapes in cluttered backgrounds," in Computer Vision and Image Understanding, 2009, vol. 113, pp. 126-149.

According to embodiments, with the tensor voting fields generated, each (initial) edge pixel can cast votes, which is a 2×2 matrix, to pixels in its neighborhood based on its tensor voting field. On the other hand, each pixel in the initial image 702 receives votes from each of the initial edge pixels in its neighborhood and accumulates them. The result is a tensor image, where each pixel has a 2×2 matrix as its value. Thus, the tensor image (not shown) is a derivative of the initial image 702, wherein each pixel (or at least some of the pixels) has assigned a tensor sum ("tensor value"), the tensor sum being obtained by summarizing the votes cast on said pixel by its neighbors.

Tensor Analysis

Figures 8A, 8B, 8C:
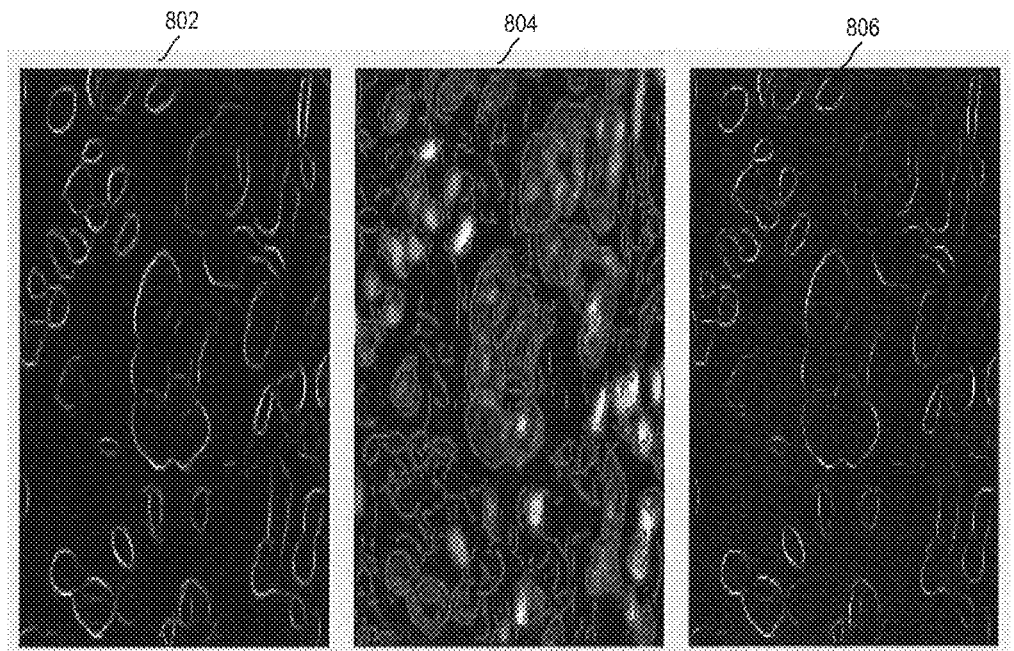
FIGS. 8A to 8C illustrate each of a saliency edge image 8A, a refined edge image 8B, and a saliency edge strength image 8C, respectively, in accordance with the present invention.

After the tensor image is generated, tensor analysis is performed to generate the saliency edge image as shown in FIG. 8A and a major eigenvector image (not shown).

At each pixel in the tensor image, eigenvectors and respective eigenvalues can be calculated based on the tensor value ("tensor sum") calculated for said pixel. The eigenvectors can consist of a first eigenvector, also referred to as major eigenvector, and a second eigenvector, also referred to as minor eigenvector. The eigenvalue of the major eigenvector is the major eigenvalue. The eigenvalue of the minor eigenvector is the minor eigenvalue. The value of each pixel in the saliency edge image is calculated as the absolute difference between the two eigenvalues.

The value of each pixel in the major eigenvector image is the eigenvector corresponding to the large eigenvalue, i.e., "the major eigenvalue". Thus, according to embodiments, the major eigenvector image is calculated from the tensor image by determining, for each of the pixels, the two eigenvalues, identifying the larger one of the eigenvalues as the major eigenvalue and using the eigenvector corresponding to the identified major eigenvector as a data value representing each pixel in the major eigenvector image.

Based on the saliency edge image and the major eigenvector vector image, a refined edge image 804 as shown in FIG. 8B is generated using multiple response suppression and hysteresis thresholding, which has less fake and missed edges.

According to embodiments, a refined edge mask is generated from the refined edge image 804 wherein all pixels not belonging to an edge of the refined edge image 804 are mask pixels.

The saliency edge strength image 806, as shown in FIG. 8C, is generated by zeroing out the pixels in the saliency edge image 804 that don't belong to the refined edge mask, which not only indicates where the edge pixels are, but also the likelihood of the edge pixel being a true edge pixel.

Local Histogram Generation

After the saliency edge strength image 806 is generated, local histograms 410, 412 are generated to ascertain local thresholds that are utilized for ascertaining which pixels are nuclei pixels and which are not (nuclei pixels refers to any pixel of a nuclei and not only the determined nuclei edge pixels).

In an exemplary embodiment of the present invention, the saliency edge image 8A is divided into blocks (S662) of pixels. Preferentially, the block size is approximately the diameter of a cell nucleus. For example, each block may be a square whose width is between half and twice the diameter of a nucleus. Instead of blocks (squares of pixels), any other form of sub-regions of the image, e.g. rectangles, triangles, polygons or the like, may be used.

For each edge pixel 408 in each of the blocks, a candidate foreground pixel 404 and a candidate background pixel 406 is sampled based on the gradient direction of the edge pixel (S663). The sampling process is described in greater detail in the figure description of FIG. 4B. In our embodiment of the present invention, the nucleus is brighter than the background in general, the foreground pixel is sampled along the gradient direction (from dark to bright) and the background pixel is sampled in the opposition direction. In case the nucleus is darker, the selection will be performed the other way around.

For each block, a local histogram for the background pixels (the "background histogram" 410) and a local histogram for the foreground pixels (the "foreground histogram" 412) are generated. The intensity value of the edge pixel of the saliency edge image 802 (and thus, the saliency value of the edge pixel 408 which is calculated as the sum of all votes cast on said pixel 408) is used as the weight for the foreground pixel and the background pixel to generate the two histograms (S664). In an unweighted histogram, each intensity value (or intensity value bin) has assigned a probability of a pixel in a particular pixel set having said particular intensity value. For example, the probability can be calculated by dividing the number of pixels of a pixel set having said intensity value by the total number of pixels of the pixel set for which the histogram is created. In a weighted histogram, not only the number of pixels having a particular intensity value are used as input for calculating the probability that a pixel in the examined set has said intensity value, but also the weight assigned to said pixel is used as input for creating the histogram, which represents a probability distribution.

Threshold Determination

After the histograms are determined, the threshold determination module determines, based on the two histograms (i.e., the foreground histogram and the background histogram), the optimal threshold for the block (S665), which minimizes the classification error for the foreground and the background samples. The threshold value is an intensity value of an initial image pixel, not a saliency value. For an image block having no edge pixels, the maximum intensity inside the block is calculate and used as the threshold value. The threshold values calculated for each block are used as the threshold value at the center (S666) of said block After the local threshold for each block is generated, the threshold for each pixel in the image is generated by interpolation (S667), either linear or bilinear, via grid structure or triangulation. As a result of the interpolation, each pixel of the initial image corresponds to and has assigned an interpolated threshold value.

Result Generation

Next the result determination module applies the determined threshold to the original input gray scale image 702, which can be a monochrome image obtained directly from a microscopy image acquisition system or indirectly via color deconvolution from a color image obtained from a bright field microscopy image acquisition system (such as Ventana iScan Coreo or iScan HT), to generate a foreground image (S668). The foreground detected is further utilized to segment individual nuclei based on a variant of watershed algorithm [2, 3, 4].

Figure 1:
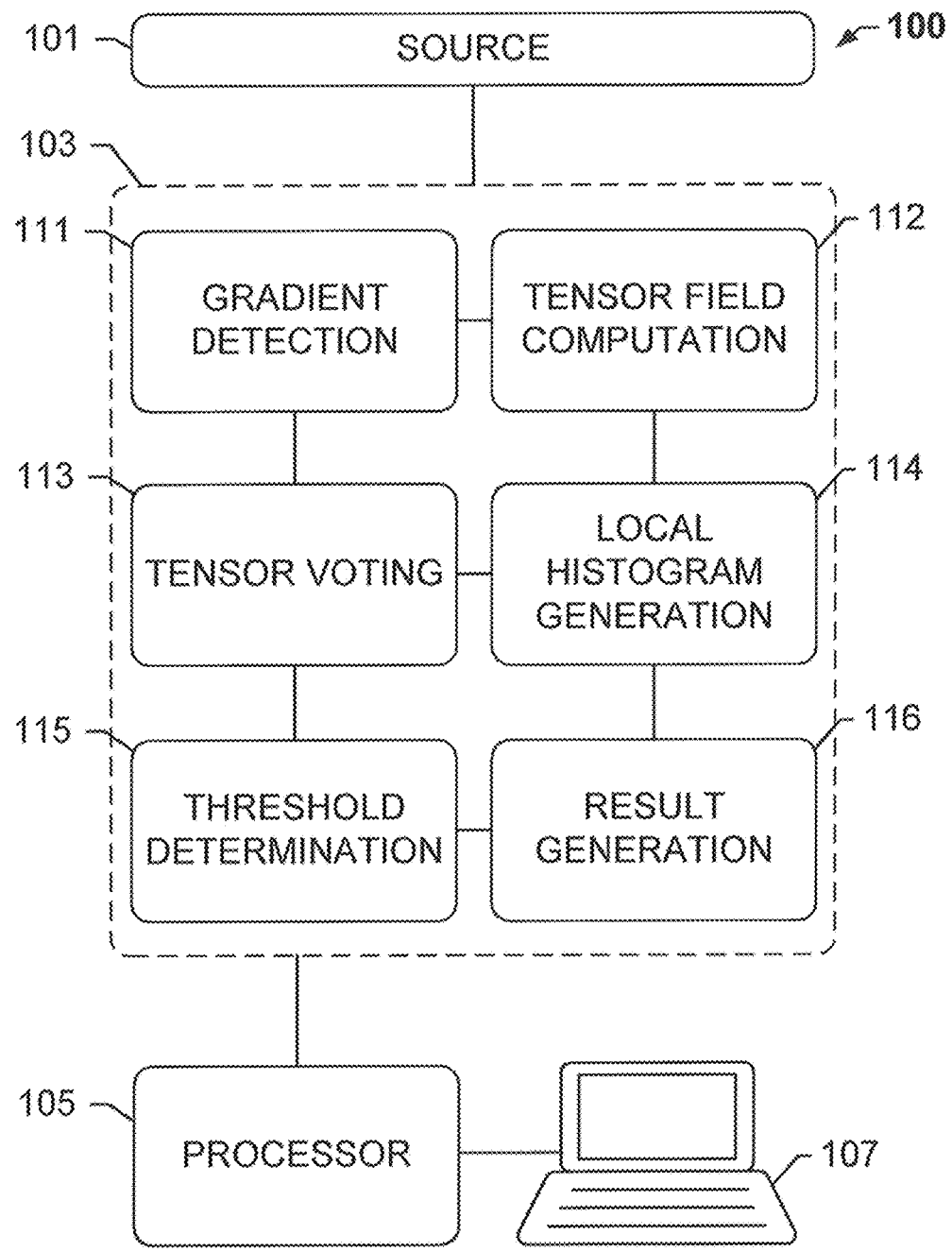
FIG. 1 shows a system for adaptive thresholding, according to an exemplary embodiment of the present subject disclosure.

FIG. 1 shows a system for adaptive thresholding according to an exemplary embodiment of the present subject disclosure. System 100 comprises a source 101 for generating a source image, including any combination of an assay, microscope, and scanner. Source 101 is in communication with a memory 103, which includes a plurality of processing modules or logical operations that are executed by processor 105 coupled to interface 107. For instance, a sample, such as a biological specimen, may be mounted on a slide for purposes of imaging by a microscope, camera, scanner, or other imaging device coupled to memory 103, with analysis of images of the specimen being performed by processor 105 executing one or more of the plurality of modules stored on memory 103 in accordance with the present disclosure. The analysis may be for purposes of identification and study of the specimen. For instance, a biological or pathological system may study the specimen for biological information, such as detecting tissue and cellular structures, nuclei, the presence of proteins, protein fragments or other markers indicative of cancer or other disease, or for other purposes such as genomic DNA detection, messenger RNA detection, protein detection, detection of viruses, detection of genes, or other.

The specimen may be stained by, for instance, an automated staining/assay platform, such as the Discovery™ automated slide staining platform of the assignee Ventana Medical Systems, Inc. The resulting slide or assay may be illuminated by a light source and imaged by an imaging system such as a camera. The light source may comprise a narrow band light source such as a laser, or RGB white light intended to be viewed through a brightfield microscope. The camera platform may also include a microscope having one or more objective lenses and a digital imager, as well as a set of spectral filters. Other techniques for capturing images at different wavelengths may be used. Camera platforms suitable for imaging stained biological specimens are known in the art and commercially available from companies such as Zeiss, Canon, Applied Spectral Imaging, and others, and such platforms are readily adaptable for use in the system, methods and apparatus of this subject disclosure.

The image 702 may be supplied to the memory or computer-readable medium 103, either via a wireless, via a wireline connection, e.g., a cable connection between the source 101 and computer 107, via a computer network, or using any other medium that is commonly used to transfer digital information between computers. The image may also be supplied over the network to a network server or database for storage and later retrieval by computer 107. Besides processor 105 and memory 103, computer 107 also includes user input and output devices such as a keyboard, mouse, stylus, and a display/touchscreen. As will be explained in the following discussion, processor 105 executes modules stored on memory 103, performing analysis of the image, morphological processing of the image or image data derived from such images, quantitative analysis, and display of quantitative/graphical results to a user operating computer 107.

Modules stored on memory 103 include a gradient detection module 111, tensor field computation module 112, tensor voting module 113, local histogram generation module 114, threshold determination module 115, and result generation module 116. The operations performed by these modules are not limited to those described herein, and the sequence, arrangement, and total number of modules may vary, with the presently described embodiment being solely for example purposes.

For instance, gradient detection module 111 may be executed to determine that one or more pixels or regions of the image corresponds to or indicates a presence of an edge of a target structure. A high contrast or gradient between different pixels may indicate a presence of an edge within the image block, region, or field of view. Regions may be selected from features detected via automated or manual selection of structures or regions within the source image received from source 101. Features may be automatically determined based on image analysis, tissue heterogeneity, etc., or may be selected by the user. In some instances, a greyscale image or single color channel of an RGB image may be sampled to annotate specific regions, such as cells or nuclei. The identified areas may be used to define a field of view for subsequent operations. In some embodiments, the image may be uniformly divided into regions or blocks depending on a scale of the image and a target structure of interest. Pixels within these regions or blocks may be selected as initial pixels for subsequent operations as described herein. Other methods for determining initial edge pixels may become evident to those having ordinary skill in the art upon reading this disclosure.

Tensor field computation module 112 is then executed to determine a plurality of tensor fields for a corresponding plurality of orientations. Each orientation corresponds to a predefined angle, e.g. 2°, 4°, 6°, . . . , 360°. In this example, 180 uniformly distributed angles are covered, but other numbers of division and distribution are also possible. As described below, a 2-dimensional tensor is a 2-by-2 matrix. The tensor field represents a 2-dimensional array of tensors. For example, the 2-dimensional array of tensors of a tensor field may comprise as many tensors as pixels exist in the original image 702. For efficient implementation, a plurality of tensor fields are generated at a corresponding plurality of orientations ("angles") uniformly distributed, resulting in a 3-dimensional array, with the first dimension being the angle index. For example, there may be a first tensor field for angle 0°, a second tensor field for angle 2°, . . . , and an $180^{th}$ tensor field for angle 358°. All the tensor fields may be calculated before the voting operations start. The pre-computed tensor fields enable faster retrieval of tensors when performing tensor voting operations. Rather than calculating 180 tensor tokens/orientation-specific tensors for each pixel in the image, which might result for an image comprising 1000 pixels in 180.000 individual steps, only a comparatively low number of calculation steps (e.g. 180 for 180 different angles/tensor voting fields) are performed for providing the input data used in the voting process.

Tensor voting module 113 is executed to perform tensor voting operations that result in a tensor image (not shown), which is further used to generate saliency values for the pixels in the saliency edge image 802. Briefly, each initial edge pixel 316 is designated as a voting pixel, and pixels within the voting field of the pixel are voted upon, with the votes being determined based on neighboring pixels that fit within threshold ranges of voting curvature and voting angle. The thresholds are selected based on the shape of the structure to be detected and imaging characteristics to suppress unlikely edge pixels and enhance likely ones. Some examples are presented after the figure description of FIG. 9.

The gradients of the pixels on the edge of the same nucleus point approximately toward the same position and are encoded using two-dimensional stick tensor field overlaid on the initial edge pixels. The two-dimensional tensors may be retrieved from the precomputed tensor fields as described above. These operations are further described with respect to FIGS. 3A-3C. The resulting tensor image enables generation of a saliency edge image 802, and determining the eigenvector corresponding to the large eigenvalue, i.e., saliency edge normal direction at each pixel.

Having identified likely edge pixels for the region of the image including the structure to be detected by performing tensor voting on the initial edge image 704, such as a nucleus, a threshold range for each region of the image is computed. Local histogram generation module 114 enables this operation by sampling a foreground pixel 404 along the gradient direction above the edge pixel 408, and a background pixel 406 below the edge pixel, and creating histograms 410, 412 for both background and foreground. Both foreground and background histograms are used to generate the threshold range at each block. Subsequently, an adaptive threshold image is generated by interpolation using the threshold ranges for the plurality of image blocks. Finally, comparing the input image 702 with the locally adaptive threshold image provides a significantly improved foreground.

Results determined by result generation module 116 may be output to a user or operator of terminal 107, or may be compiled in a report generated by processor 105 and transmitted to another computer across a network, or saved in a file. As described above, the modules include logic that is executed by processor 105. "Logic", as used herein and throughout this disclosure, refers to any information having the form of instruction signals and/or data that may be applied to affect the operation of a processor. Software is one example of such logic. Examples of processors are computer processors (processing units), microprocessors, digital signal processors, controllers and microcontrollers, etc. Logic may be formed from signals stored on a computer-readable medium such as memory 103, which includes random access memory (RAM), read-only memories (ROM), erasable/electrically erasable programmable read-only memories (EPROMS/EEPROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Figure 2:
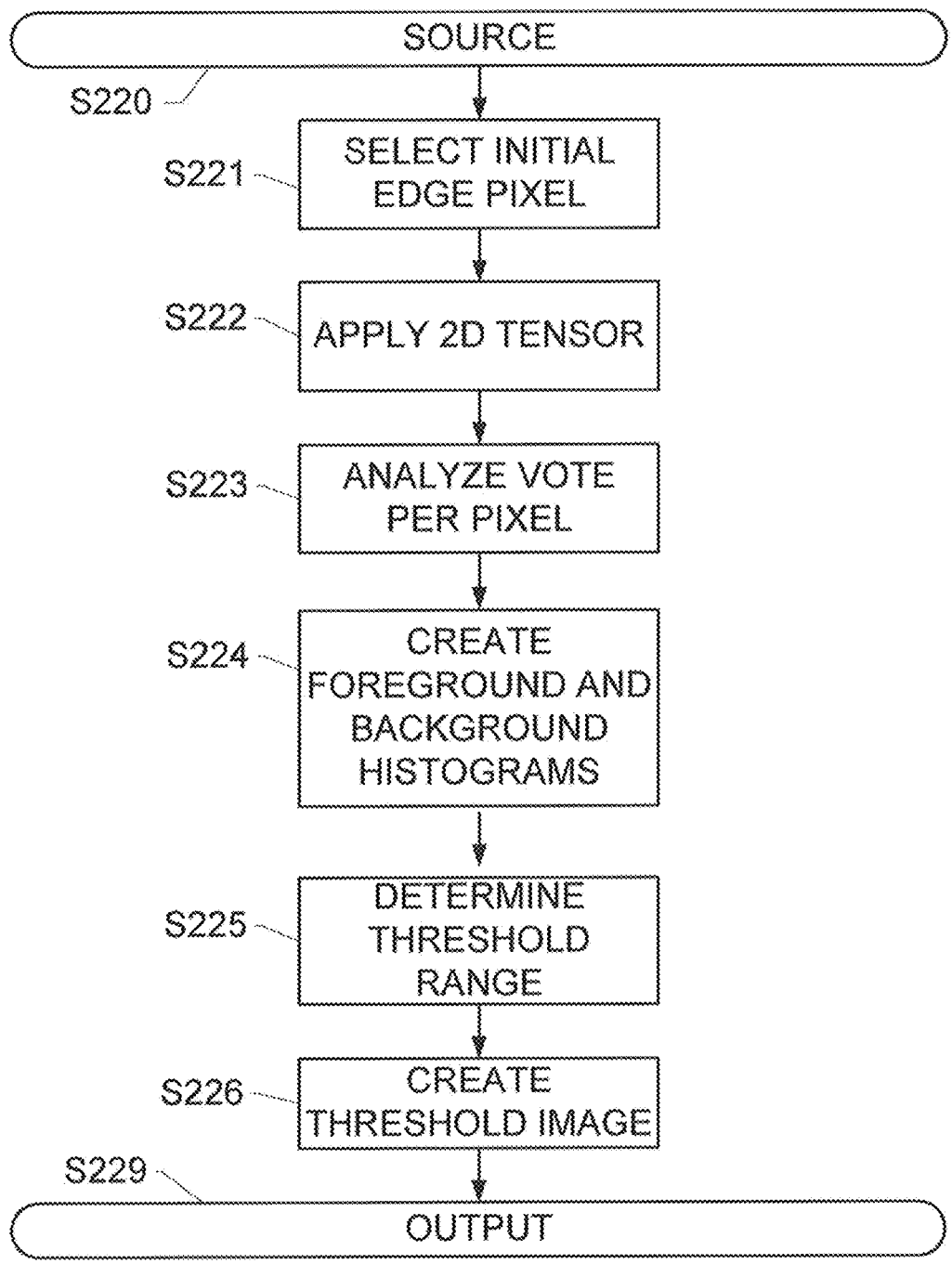
FIG. 2 shows a method for adaptive thresholding based on the edge, according to an exemplary embodiment of the present subject disclosure.

FIG. 2 shows a method for adaptive thresholding, according to an exemplary embodiment of the present subject disclosure. The method of FIG. 2 may be performed by a computer executing modules similar to those depicted in FIG. 1, with the understanding that the method steps described herein need not be performed in the described order, and may be executed in any sequence understandable by a person having ordinary skill in the art in light of the subject disclosure. The method begins (S220) with a source for generating or receiving a source image, such as a microscope combined with an imaging system for scanning an assay. The image 702 may be a greyscale image, or may be representative of a single channel in a multiplex image. Edge pixels may be approximated based on gradients identified in the image, or from features detected by tissue segmentation or manual selection of a region within the image. The image may be divided into blocks, and an appropriately-sized block of an image may be sampled to annotate specific regions, such as cells or nuclei. Each block may be sufficiently sized to contain at least one or several nuclei or nucleus clusters. Initial selections of edges or borders within the block may be performed by detecting features and pixels with values higher than a threshold.

Two-dimensional tensor voting are then applied (S222) to determine the saliency edge image 802 and from said image a saliency edge mask. Tensor fields may be precomputed at various orientations, which enable faster retrieval of tensors when performing tensor voting operations.

Pixels 322, 324 neighboring a designated initial edge pixel 408, 316 and within the voting field 310, 312 of the initial edge pixel are voted upon as further described herein. The tensor fields are designed with the consideration of consistent positions and gradient directions, i.e., neighboring pixels that are likely to be edge pixels belonging to the same nucleus or a nucleus cluster vote more for each other. A constraint is applied on the angle of the voting direction and the curvature of the voting arc to suppress unlikely edge pixels and enhance likely ones. These operations are further described with respect to FIGS. 3A-3C. The votes received per pixel are analyzed (S223) to determine whether or not the pixel is likely to be an edge/border pixel, or a junction pixel within a nucleus cluster, or an outlier (neither edge nor at a junction). The results are used to generate a saliency edge image 802 and from said image a saliency edge mask. In a saliency edge mask, all pixels not being a saliency edge pixel are mask pixels.

Having identified likely edge pixels for the region of the image including the structure to be detected, such as a nucleus, a threshold range of intensities (i.e. a maximum allowed limit and a minimum allowed limit) for the region of the image or image block is computed to enable generation of the adaptive local threshold image. Foreground and background histograms 410, 412 are generated (S224) for each block of the image. These operations include sampling a foreground pixel 404 along the gradient direction above the edge pixel 408, and a background pixel 406 below the edge pixel, and creating the histograms for both background and foreground, using the saliency value or gradient magnitude at the pixel as the weight. Both foreground and background histograms are then used to determine the threshold range at each block. Subsequently, an adaptive local threshold image is generated (S226), via interpolation using the plurality of image blocks and their respective threshold ranges.

For example, the image may be divided into 2×2 image blocks, with the threshold range at each of the four blocks are [30, 60], [40, 80], [50, 90], and [60, 100]. The adaptive local threshold image can be generated by calculating a center threshold for each of the four blocks, e.g. as the mean of the threshold range limits. For the above example, the center threshold values of the four blocks would be 45, 60, 70 and 80. However, there are many options to utilize the threshold range to obtain similar results. Then, the center thresholds are interpolated over the whole image, thereby assigning each pixel an interpolated threshold value. Comparing the input image with the locally adaptive threshold image provides a significantly improved foreground. Results may be output (S229) to a user, or may be compiled in a report and transmitted to another computer across a network, or saved in a file.

Figure 3A:
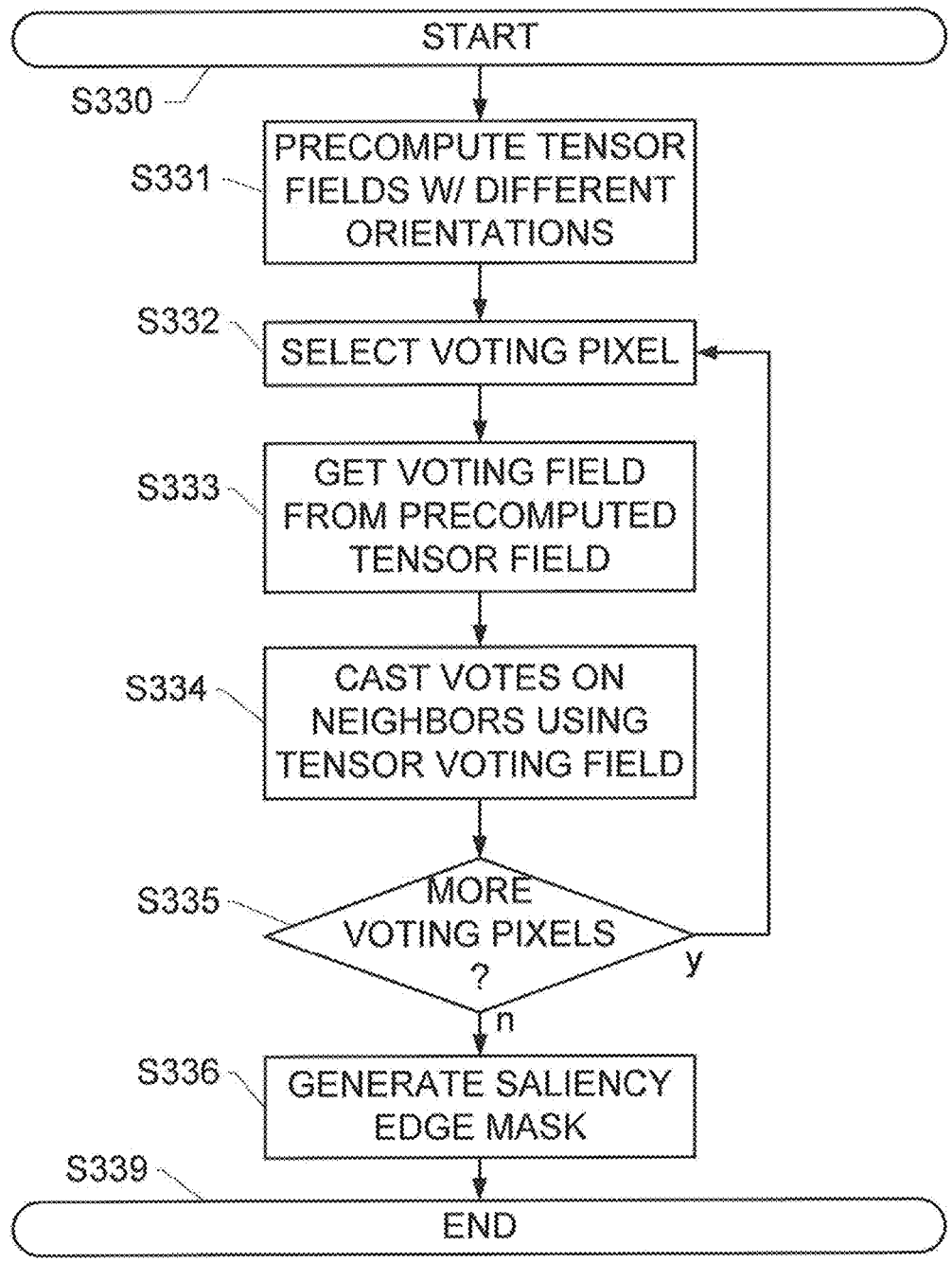
FIGS. 3A to 3C respectively show a method for tensor voting, a decay function, and the standard voting field, according to an exemplary embodiment of the present subject disclosure.
Figure 3B:
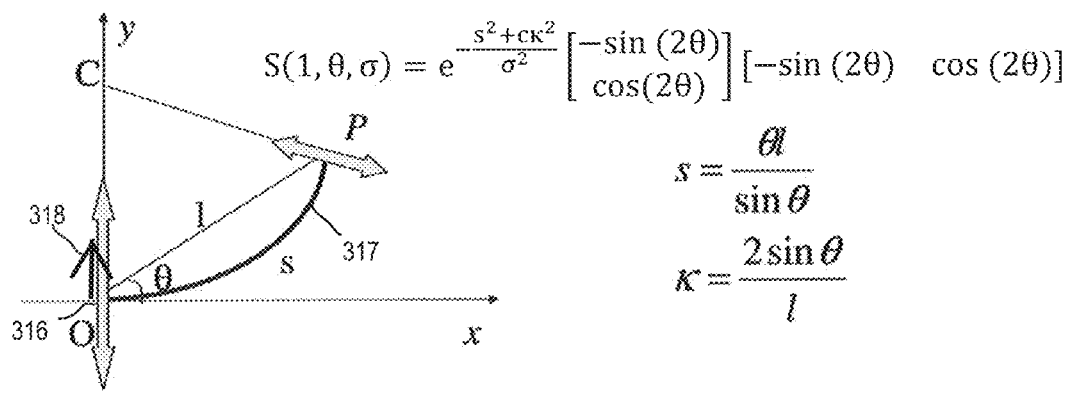
Figure 3C:
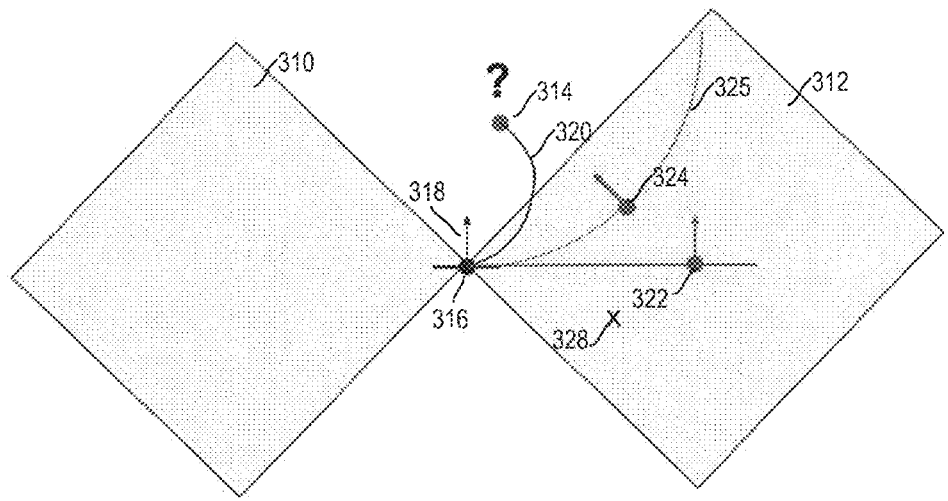

FIGS. 3A to 3C respectively show a method for tensor voting, a decay function S parameterized with the voting angle $\theta$ and the voting curvature $\mathcal{K}$, and a voting field based on the above-mentioned angle and curvature constraints, according to an exemplary embodiment of the present subject disclosure. The methods of FIG. 3A-C may be performed by a computer executing modules similar to those depicted in FIG. 1, with the understanding that the method steps described herein need not be performed in the described order, and may be executed in any sequence understandable by a person having ordinary skill in the art in light of the subject disclosure.

Referring now to FIG. 3A, the method begins (S330) with an initial edge pixel 316 with a certain gradient direction 318. A number of tensor fields are precomputed (S331) for a plurality of uniformly distributed orientations within the image. For instance, for angles between 0° and 360°, a plurality of orientations may be uniformly distributed at 2° or 3° intervals. This pre-computation enables speedy retrieval of tensors for voting at each edge pixel. Subsequent to pre-computation (S331), an initial pixel is 316 selected (S332) and designated as a voting pixel. As described above, the initial pixel may be selected from edge pixels based on a gradient value, or a detected feature. Any initial edge detection algorithm known in the art may be used for detecting the initial edge pixels of the initial edge image 704.

In either case, tensor voting operations begin for that initial pixel. The tensor field for voting at the pixel can be retrieved (S333) based on the gradient direction 318 of the initial pixel 316.

In either case, it is determined whether or not more pixels are to be analyzed (S335). If more initial pixels exist within the region of the image being analyzed, then the next initial pixel is selected (S332) and a new tensor field is retrieved (S331) as described herein. When voting is completed for all initial pixels in the image or region, a saliency edge image 802 is generated and used for generating a saliency edge mask (S336). To generate the saliency edge mask, the votes for each pixel are tallied to generate an accumulated tensor ("tensor sum"). An example for an individual vote that includes information about features of a nucleus to be detected is described in the figure description of FIG. 3A. The result of the summarization of all votes cast on a particular pixel P, the "tensor value" or "tensor sum", is also a tensor. The tensor obtained at each pixel is a symmetric non-negative definite matrix, which may further be decomposed into two stick tensor components and used to generate the saliency edge image 802 and the saliency edge mask. For example, a 2-dimensional 2nd order tensor is a symmetric non-negative definite 2×2 matrix may be depicted as follows:

$$T=\lambda_1 \cdot e_1 e_1^T + \lambda_2 \cdot e_2 e_2^T = (\lambda_1-\lambda_2)e_1 e_1^T + \lambda_2(e_1 e_1^T + e_2 e_2^T)$$

The tensor T may be decomposed as the summation of a stick tensor (also referred to as "stick tensor component") and a ball tensor (also referred to as "ball tensor component"). T is a linear combination of outer product tensors and, therefore, also a tensor. The tensor T may be a second order symmetric tensor, the eigenvalues $\lambda_1$, $\lambda_2$ are real and positive or zero and the first eigenvalue $\lambda_1$ ("major eigenvalues") is larger than or equal to the second eigenvalue $\lambda_2$ ("minor eigenvalues"). Superscript T denotes matrix transposition.

The value of $\lambda_1$ and $e_1$ and $\lambda_2$ and $e_2$ respectively represent a length and direction of a first (the major) and a second (the minor) axis of an ellipse.

The stick tensor can be expressed as: $(\lambda_1-\lambda_2)e_1 e_1^T$, wherein $e_1$ is a first eigenvector and $\lambda_1$ is the corresponding first eigenvalue of the first eigenvector. The first eigenvector and first eigenvalue together are descriptive of the length (saliency) and orientation of a stick represented by the stick tensor. In geometric terms, the saliency of the stick component corresponds to the length of a stick model underlying the stick component and represented by the major ones of the eigenvalues.

The ball tensor can be expressed as: $\lambda_2(e_1 e_1^T + e_2 e_2^T)$, wherein $e_2$ is a second eigenvector and $\lambda_2$ is the corresponding second eigenvalue of the second eigenvector. The second eigenvector and second eigenvalue together are descriptive of the saliency of the ball represented by the ball tensor. In geometric terms, the saliency corresponds to the radius of a ball model underlying the ball component.

The two eigenvectors correspond to the principal directions of the ellipse and the eigenvalues encode the size and shape of the ellipse.

Results, i.e., the calculated stick and ball tensor components, indicate a probability of each pixel being at a junction within a nucleus cluster, an edge of the nucleus, or an outlier. This determination is performed by comparing the stick and ball tensor components at each pixel. For instance, if $\lambda_1-\lambda_2>\lambda_2$, this indicates that stick component of the accumulated tensor at the pixel is larger than the ball component, and the pixel is likely on the edge of the nucleus. If $\lambda_1 \approx \lambda_2 > 0$, the stick component is smaller than ball component, and the neighboring pixel is likely at a junction or region. If $\lambda_1 \approx \lambda_2 \approx 0$, the pixel has a low saliency, i.e. is unlikely to be an edge or border pixel, and is discarded as an outlier. Moreover, every vote may be represented by a 2×2 matrix. The votes for each pixel are accumulated, and the metric of accumulated votes (the metric of the tensor sum) may be decomposed to obtain the saliency edge image 802 ($\lambda_1-\lambda_2$) and the salience edge normal direction (the eigenvector corresponding to the larger one of the two eigenvalues $\lambda_1$, $\lambda_2$ of said accumulated tensor sum T at a particular pixel). The saliency edge normal direction indicates the normal direction of an edge at a particular pixel.

FIG. 3B shows the formula function S for the calculation of the tensor voting field. This formula is also referred herein as "decay function". It is used to calculate the elements (tensor vote) in the tensor field based on the normal direction of the voting pixel (i.e. the gradient direction at said pixel), implementing the idea that pixels demonstrating better continuation (or more likely to be on the edge of the same nucleus) voting more for each other. For instance, origin O is aligned at each initial edge pixel (voting pixel) 316 with its gradient direction pointing along the y-axis (see FIG. 3B). The small letter s represents a length of the voting arc 317 between the voting pixel O 316 and the votee pixel P, K represents the curvature, and l represents the Euclidean distance between the two pixels. The x-axis and y-axis represent the x- and y-axes of the original image, whereby the origin of the coordinate system lies at the voting pixel. C represents a geometrical center that is mathematically implied by the curvature of the arc 317 connecting the pixels O and P. Sigma ("σ") is a decay parameter specifying the decay rate of the vote in dependence on the distance of a votee pixel from the voting pixel and the curvature. As the radii of most nuclei are known or well-approximated, a threshold of curvature K may be applied further to control the magnitude of the vote to cast from O to P. For example, the average diameter of a nucleus of a mammalian cell is about 5-15 μm, the average radius is 2.5-7.5 μm.

According to embodiments, pixels P (votee pixel) farther away from origin O, i.e. the voting pixel, are voted less, and pixels on voting arcs 317, 325 having curvatures outside the average or known constraints are also voted less.

In addition, or alternatively, according to embodiments, the vote cast from the initial voting pixel O on the votee pixel p is decreased or is zero in case the point P lies in opposite direction of the gradient vector at the voting pixel O (the gradient vector points in the direction of the nucleus). For example, the vote cast from the initial voting pixel O on the votee pixel p is decreased or is zero in case in the tensor field for voting directions with angle θ lies within a predefined range of degrees covering pixels on the opposite side of the direction of the gradient at the respective IVP. Such a predefined range can be, for example, 190 degrees to 350 degrees.

For any voting pixel, a positive decay-factor-modulated-tensor vote is cast on pixels that satisfy the constraints. A detailed description of the calculation of the vote according to an example is given in the description of FIG. 3A.

The knowledge of nuclei curvatures (based on the known radii) is used to determine voting field/region for neighboring pixels, depicted in FIG. 3C. The decay function S of FIG. 3B is applied to one or both sides 310, 312 of the voting field. The decay function may be asymmetric along up and down sides of the voting field, in which case a higher vote may be cast to the pixels on the upside ("upside" here means in the supposed direction to the interior of the cell nucleus; this direction may be derived from the gradient vector 318 at the voting pixel 316). Further, the voting field is dynamic and rotates based on gradient direction 318 of the initial voting pixel 316. The voting field may be based on tensor fields pre-computed in step S331 of FIG. 3A, enabling faster generation or retrieval of tensors during voting between pixels. The grey boxes shown in FIG. 3C depict pixels onto which the voting pixel 316 casts higher votes than on pixels outside the grey areas.

According to embodiments, the rectangular neighborhood is aligned with the direction of the gradient at IVP O and aligned with the tangent direction at the IVP. The tensor voting field of the IVP O is asymmetric in the direction of the gradient of the IVP.

According to embodiments, the IVP casts a vote with a less amount ("weight") or zero on any pixel lying in the opposite direction of the intensity gradient, i.e., lying in the direction of inner parts of the supposed nucleus.

According to embodiments, the borders of the grey areas 312, 310 are sharp: all pixels in the grey rectangles are considered as the neighbor pixels of initial voting pixel O which receive a vote from O. All pixels in the white areas are not considered neighbors of pixel O and do not receive a vote from pixel O. For example, the longer side of the rectangle may be 27 pixels for 20× magnification images from Ventana scanners.

According to other embodiments, the border between the grey and white areas may in fact be smooth, i.e., the grey areas may not have a sharp border. Rather, the votes may decay gradually in dependence on the distance of a votee pixel from the voting pixel given a particular voting arc 325. The amount/weight of a vote of pixel O to a pixel in a white area may approximately be zero.

The irregularly shaped line 320 may depict the real outline of a nucleus. The arc 325 is the voting arc connecting the voting pixel 316 with the votee pixel 324 and is used for calculating a vote for pixel 324. Pixel 314 may be another pixel on the "real" outline of the nucleus. The votes are higher along the direction of the tangent (gradient normal) at the voting pixel 316 than along the direction of the gradient. As can be inferred from the grey areas 310, 312 being non-square rectangles, the votes are higher if a pixel is closer to a voting arc that reflects the typical curvature of the outline of a cell nucleus. Contrary to a "symmetric" vote where the tensors at point pairs (O, P) along the intensity gradient of the voting pixel lying equally far apart from the voting pixel are the same, the "asymmetric" tensor field results in a voting pixel voting more favorably in the gradient direction than the opposite direction.

Figure 4A:
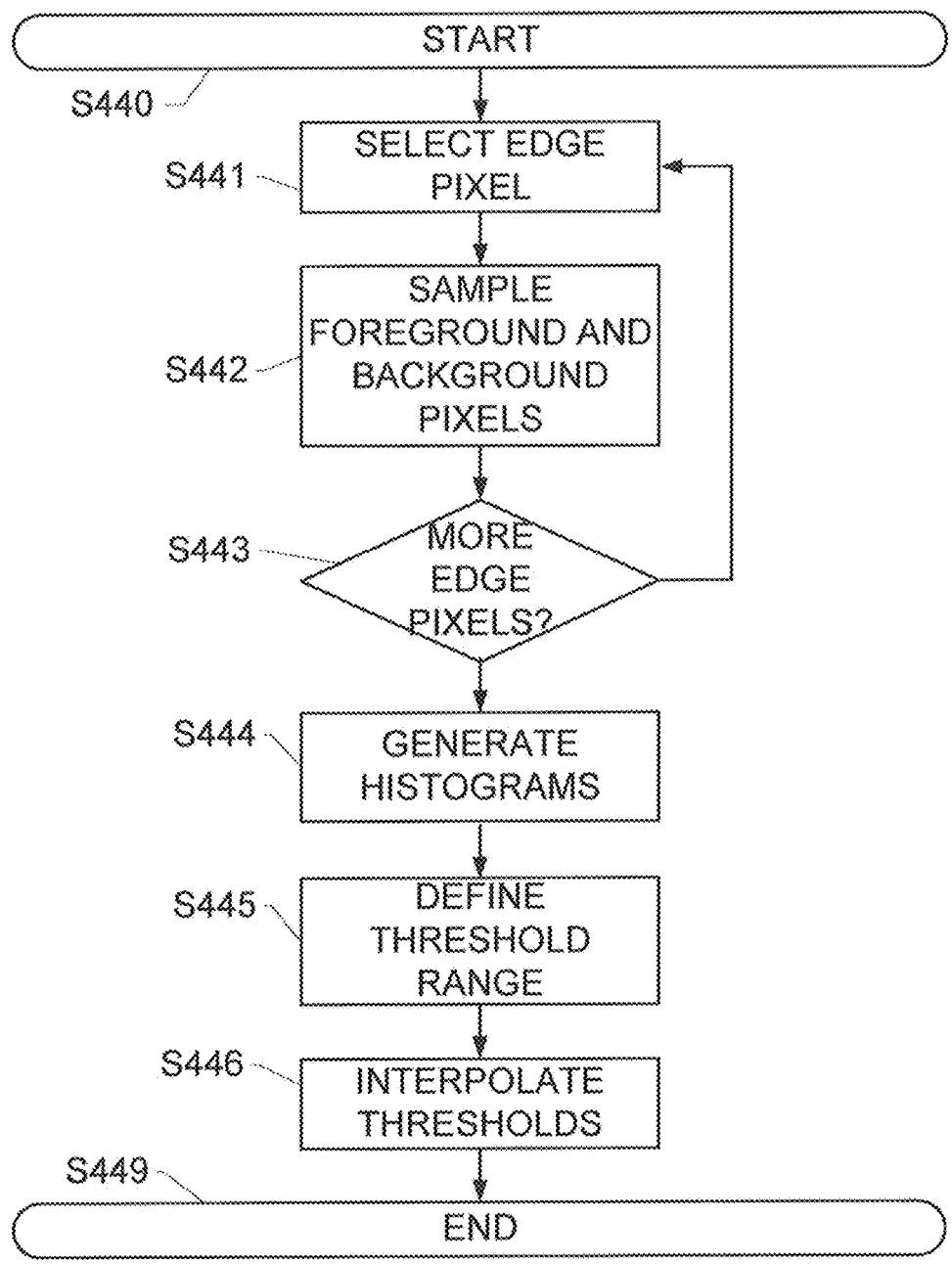
FIGS. 4A to 4C show a method for local threshold generation, according to an exemplary embodiment of the present subject disclosure.
Figure 4B:
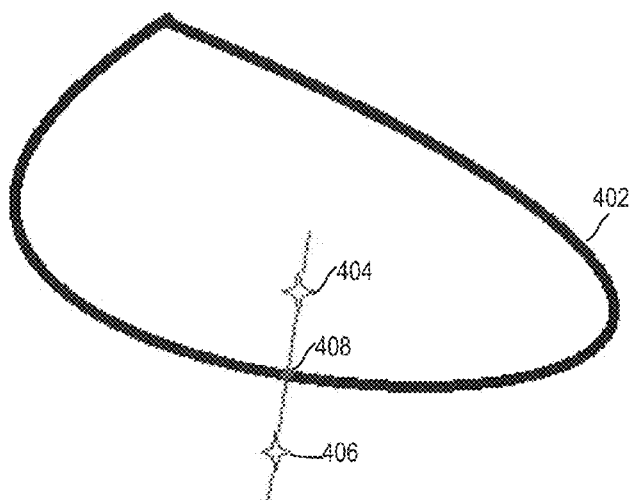
Figure 4C:
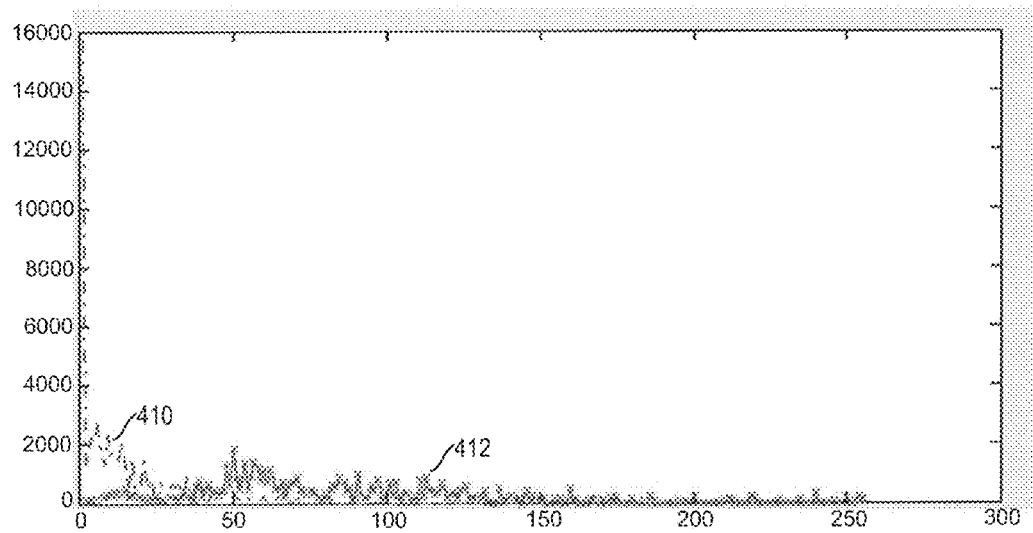

FIGS. 4A-4C shows a method for local threshold generation for each block of pixels, according to an exemplary embodiment of the present subject disclosure. As described herein, for each initial edge pixel or saliency edge pixel 408 detected by tensor voting, a foreground pixel 404 and a background pixel 406 along a gradient direction 318 (or the saliency normal direction of the pixel 408) are sampled (i.e., selected and added to a foreground sample set or a background sample set of pixels). The distance between the two sampled pixels and the edge pixel may be, for example, 2-3 pixels, depending on the scale of the image or image block, and the size of the nucleus, as shown in FIG. 4B. The distance from the edge pixel 316, 408 at which the pixels are sampled may be predefined and is preferentially smaller than a radius of a nucleus. As described herein, the image may be divided into small sub-regions. For example, a 20× magnified image may be split into blocks of 50×50 pixels. For each set of foreground/background pixels sampled in each block, two corresponding histograms may be generated per block, as further shown in FIG. 4C.

Referring to FIG. 4A, the method may begin with a selection of an edge pixel (S441) 408 as described herein. The selected edge pixel is likely a true edge, and may be based on the results of a tensor voting operation. A line is drawn normal to the edge through the edge pixel, and one foreground pixel 404 and one background pixel 406 is sampled (S442) for the edge pixel along the gradient direction and in the opposite direction. See FIG. 4B for an exemplary pixel selection. A determination is made as to whether or not there are additional edge pixels in the block (S443), and if there are, the next edge pixel is selected (S441) and foreground and background pixels sampled (S442).

If there are no more edge pixels, then the method continues to the generation of foreground 410 and background histograms 412 for the block (S444). Saliency modulated background histograms and foreground histograms are generated based on the foreground and background pixels sampled within each image block. The histograms are saliency modulated as they are weighted by saliency value of the edge pixels as determined by tensor voting, or based on the value of the gradient magnitude. See FIG. 4C for exemplary histograms for background and foreground of a single image block. Both histograms are shown within one plot. The histograms are used to define a threshold range for the image block (S445), so as to minimize the histogram based classification error. An appropriate threshold range is selected for minimizing the error caused by mixing up background and foreground pixels, which is generally a consequence of false positives or false negatives in edge detection that is alleviated by the saliency modulated histograms described herein.

According to embodiments, the two histograms 410, 412 stem from taking foreground pixels 404 from the inner side of an edge and taking background pixels 406 from an "outside" of said edge pixels. If the intensity of all pixels inside, on and outside of an each edge pixel 408 would follow a homogeneous intensity gradient, the two "ideal" histograms would not overlap, i.e., there would be no intensity value that is observed both in the foreground histogram and in the background histogram. In reality, due to imaging noise and other noise sources (staining and tissue preparation), the two histograms overlap, meaning that there are one or more intensity values for which pixels exists both in the foreground and in the background histogram. Minimizing the error means automatically determining an intensity threshold such that the number (weighted by the saliency value) of foreground pixels below the threshold and background pixels above the threshold is minimized. According to embodiments wherein the background and foreground pixels are weighted in dependence on their saliency value or gradient value of the pixel used for selecting the foreground or background pixel during the sampling, minimizing the error means automatically determining an intensity threshold such that the saliency weighted number of foreground pixels below the threshold and background pixels above the threshold is minimized.

According to embodiments, the optimal threshold is range instead of specific value. For example, a first intensity threshold could identify (intensity based classification) all pixels below said first threshold as background pixels and a second threshold could identify all pixels above the second threshold as foreground pixels. For example, the first threshold may be the highest intensity value in the background histogram of said block which is not also contained in the foreground histogram. The second threshold may be the lowest intensity value in the foreground histogram of said block which is not also contained in the background histogram.

The threshold value/range is calculated for each block individually and assigned to the center of said block. Finally, the threshold may be interpolated (S446) at each pixel based on the intensity threshold range for each image block. Block threshold triangulation or bilinear interpolation may be performed at each pixel. The end result (S449) is a threshold image (now shown).

For instance, the image 702 may be divided into several blocks, e.g. 14×13=182 blocks, each block having a calculated threshold range. For example, the threshold range of each block may comprise a lower ("first") threshold and an upper ("second") threshold. The first and second thresholds can be calculated, for example, as described above. For each block, an average intensity threshold value may be calculated of the lower and upper threshold and be assigned to the geometrical center of the block. The threshold at each pixel in the threshold image is obtained by interpolation based on the 182 threshold ranges.

Figure 5A:
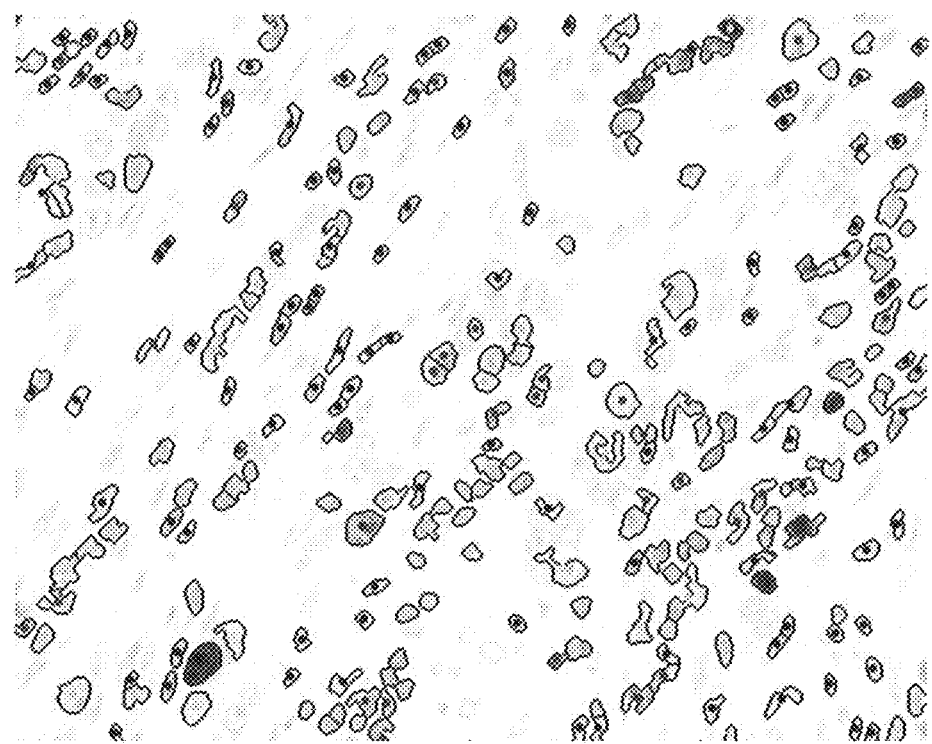
FIGS. 5A and 5B show detected nuclei for prior art methods versus the disclosed exemplary embodiments of the present subject disclosure.
Figure 5B:
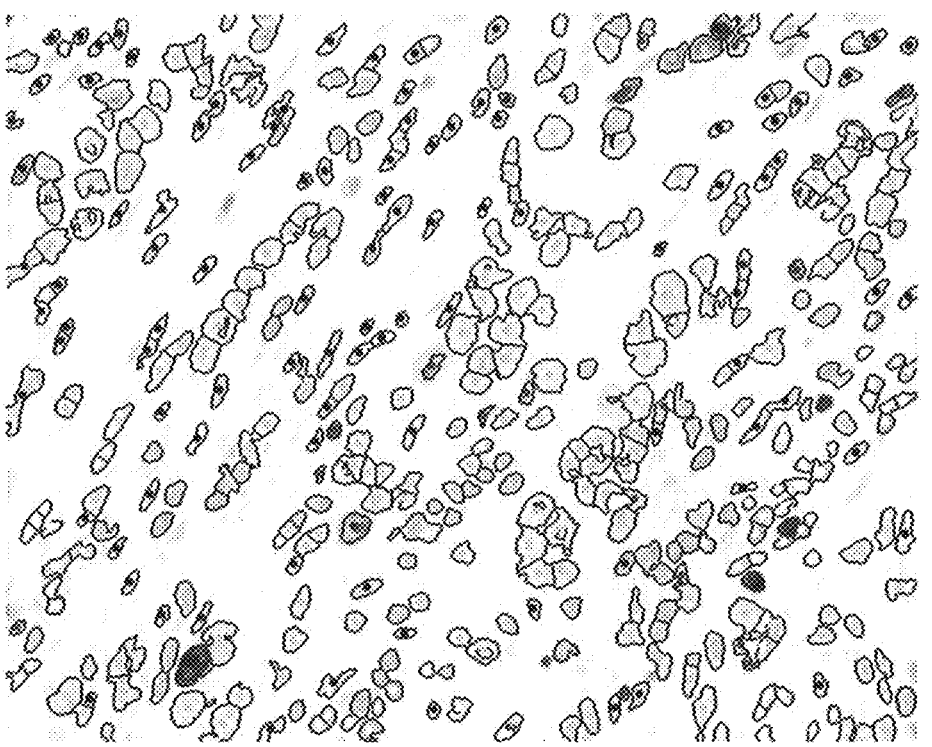

The threshold image may be compared with the source image to determine the foreground, i.e., if a pixel value exceeds the threshold determined by the above methods, it is a foreground pixel. This enables a more accurate determination of nucleus presence in the image, reducing false positives and false negatives from the prior art. FIGS. 5A and 5B show detected nuclei for prior art methods versus the disclosed exemplary embodiments of the present subject disclosure. Clearly, the nuclei detection results are better in FIG. 5B, versus the prior art result shown in FIG. 5A.

Figure 9:
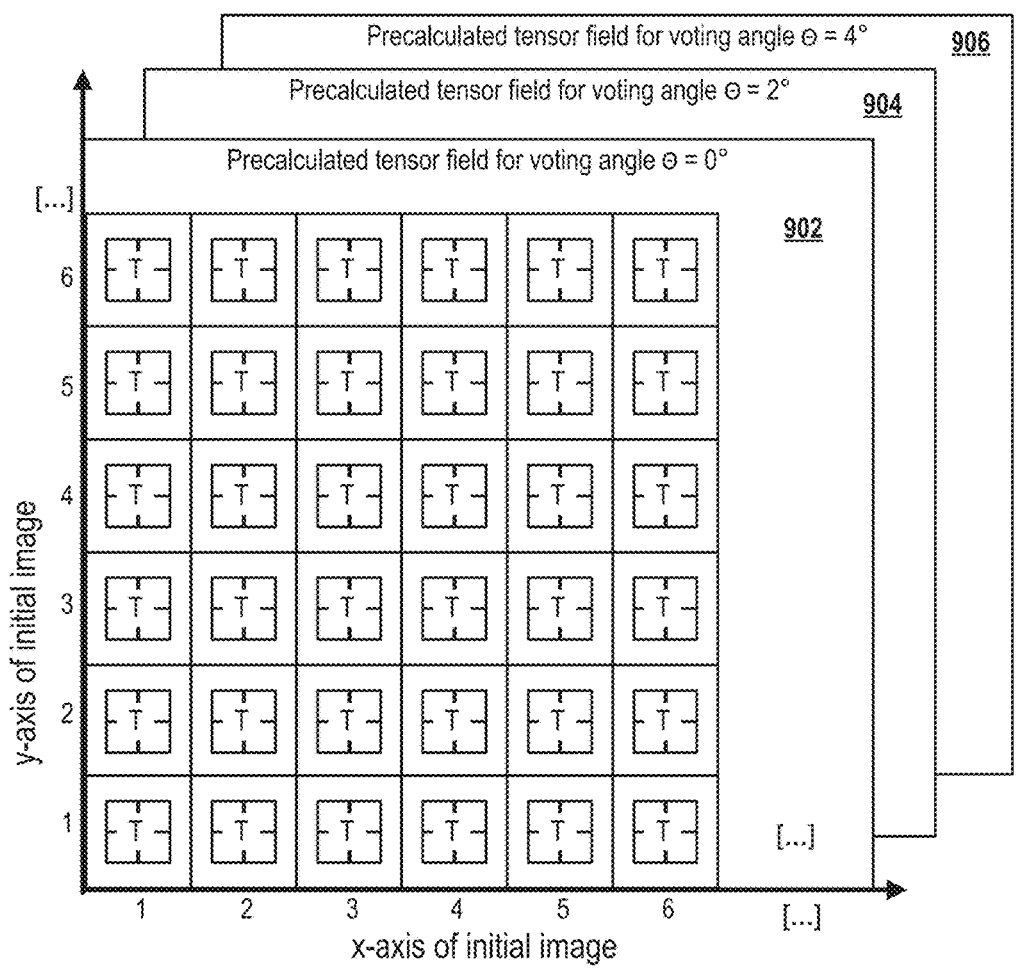
FIG. 9 illustrates angle specific tensor voting fields.

FIG. 9 illustrates voting-angle specific tensor voting fields 902-906. The x- and y-axes correspond to the axes and respective pixels of the initial image 702. Each pixel, e.g. pixel 910 at x-position 2 and y position 1 has assigned a tensor T, which can be represented as a 2×2 matrix, calculated based on the equations in FIG. 3B.

The processor of the image analysis system calculates, for each of a plurality of predefined angles, in a single calculation step, a respective nonsymmetric tensor voting field. Each tensor of each of the calculated nonsymmetric tensor voting fields comprises information on the direction of the intensity gradient at each of the initial voting pixel for which the tensor voting field was calculated, but does not comprise information on the IVP's intensity gradient magnitude. For example, the formula depicted in FIG. 3B takes into consideration the pixel distance information via arc lengths.

According to embodiments, each tensor voting field selectively comprises tensors having been pre-computed for pixels whose gradient direction is identical or most similar to the one predefined angle for which said tensor voting field was calculated.

For example, the formula below is used to calculate the tensor voting field in the local polar coordinate system where the gradient direction of the pixel to cast the vote is aligned with the 90 degree direction:

$$S(1, \theta, \sigma) = e^{-\frac{s^2+c\mathcal{K}^2}{\sigma^2}} \begin{bmatrix} -\sin(2\theta) \\ \cos(2\theta) \end{bmatrix} [\, -\sin(2\theta) \quad \cos(2\theta) \,]$$

In order to calculate a vote of a particular IVP in respect to a particular neighboring pixel, the pre-calculated tensor field calculated for an angle that is identical or very similar to the IVP-gradient angle is identified and aligned with the digital image 702. The aligning may be performed such that the center of the tensor field locates at the voting pixel. To achieve this for a particular gradient direction a of the particular IVP, the domain of the tensor field (or elements thereof, e.g. a set of integer x,y coordinates) is rotated (an angle of $$\frac{\pi}{2} - \alpha$$

clockwise). The rotation may be performed in a local polar coordinate system. As a result of the rotation, a set of corresponding input parameters for the vote calculation is obtained, i.e. the parameter I indicating the Euclidian distance between the one initial voting pixel and the one neighboring pixel, and the voting angle θ. Said input parameters derived from the rotation are used as input, e.g. in the formula depicted in FIG. 3B, for calculating a vote. After the alignment is accomplished, the relative position information of the one IVP and the one neighboring pixel is used to obtain the tensor from the tensor field to be used for casting votes as described in other sections of this document.

According to embodiments, the formula $$S(l, \theta, \sigma) = e^{-\frac{s^2+c\mathcal{K}^2}{\sigma^2}} \begin{bmatrix} -\sin(2\theta) \\ \cos(2\theta) \end{bmatrix} [-\sin(2\theta) \quad \cos(2\theta)]$$

is at least partially resolved and transformed into a derivative formula $$S(l, \theta, \sigma) = e^{-\frac{s^2+c\mathcal{K}^2}{\sigma^2}} F,$$

wherein F is a constant that solely depends on the predefined angle for which the current tensor voting field is pre-calculated. F may be calculated according to:

$$F = \begin{bmatrix} -\sin(2\square) \\ \cos(2\square) \end{bmatrix} [-\sin(2\square) \quad \cos(2\square)].$$

By precalculating angle-specific tensor voting fields, i.e., tensors for all pixels in an image 702 in respect to a particular orientation, computational resources may be saved. Each angle-specific tensor voting field 902, 904, 906 comprises information on the gradient direction of the intensity gradient at each pixel. The angle-specific tensor voting fields are calculated before the actual voting process starts, i.e., they are "pre-calculated". When the processor actually performs the tensor voting operations, the processor identifies an angle between the intensity gradient direction of the initial voting pixel 316 and the x-axis of the image. This angle is referred herein as the IVP-gradient angle. The IVP-gradient angle at a particular pixel 316 used as initial voting pixel may be, for example, 5.6°. In the pre-calculation phase, tensor voting fields for the predefined angles 0°, 2°, 4°, 6°, . . . , 358° may have been calculated. In the voting phase, the one of the plurality of calculated tensor voting fields that was calculated for an angle being identical or the most similar to the identified IVP gradient angle (5.6°) is identified (in this case: the tensor voting field calculated for the angle 6°). Then, the processor uses the identified, pre-calculated tensor voting field for calculating the vote cast by the one initial voting pixel on the neighboring pixel. This may have the advantage that the voting process may be significantly accelerated. In addition, according to embodiments, the vote cast by the initial voting pixel 316 on a neighboring pixel P is weighted in dependence on the intensity gradient magnitude of the voting pixel.

Tensor Voting Based on Biological Domain Knowledge

In the following, examples are described to illustrate the modification of a tensor voting field by features of the nucleus whose edge is to be determined in order to provide a particularly accurate edge detection and nuclear segmentation method.

At first, a digital histopathology image, e.g. a H&E image or IHC image, is read from a storage medium or is dynamically received from a microscope or bright field microscopy image acquisition system (such as Ventana iScan Coreo). For example, the digital image may depict a breast cancer tissue biopsy stained with diaminobenzidine (DAB) providing a brownish image and/or hematoxylin (HTX) providing a bluish image. The brownish or bluish image is converted to a grayscale image 702, e.g. via PCA or color deconvolution.

In the next step, the system applies and edge detection algorithm on the grayscale image 702. For example, the Canny edge detection method or any other edge detection method known in the art may be applied to identify initial edges as depicted in image 704. Typically, the edges identified in this step comprise several false positives (noise, staining artifacts) and/or false negatives (real nuclear edges which were not identified as edges). In order to increase the accuracy of edge detection, additional steps are performed as explained in the following.

For each pixel in the digital grayscale image 702, the system determines an intensity gradient. If a gradient-based edge detection algorithm is used, this step may have already been performed during initial edge detection. The gradient information is used for generating a tensor image. In the tensor image, each pixel of the grayscale image pixel is represented by a respective second order tensor that captures both the gradient orientation information and its confidence, or saliency. Such a tensor can be visualized as an ellipse, whereby the shape of the tensor defines the type of information captured (point or edge). For instance, a very salient edge element is represented by a thin ellipse whose major axis represents the predicted edge direction and whose length reflects the saliency of the prediction. The first and second eigenvectors of each tensor correspond to the principal directions of the ellipse and the first and second eigenvalues respectively encode the size and shape of the ellipse.

After having encoded the gradient information of the grayscale image in the tensor image, the system performs a voting procedure that uses a particular form of tensor voting. Tensor voting can be described as a process that propagates and aggregates the most likely edge-normal(s) encoded by means of second-order tensors.

The tensor voting procedure according to embodiments of the invention uses a nonsymmetric tensor voting field which incorporates knowledge of structural features of the nuclei to be identified for calculating the votes. A tensor field as used herein is a data structure assigning a tensor to each neighborhood pixel of the voting pixel in image 702. According to embodiments, the tensor voting field for a particular voting pixel is retrieved according to the direction of the gradient direction from a pre-computed set of tensor fields. The vote cast by each tensor of the tensor voting field is weighted by the magnitude of the intensity gradient of its respective pixel.

The voting is based on the hypothesis that edges are usually smooth and that therefore, given a known orientation of the gradient-normal at the voting pixel, the orientation of the normal at a neighboring pixel can be inferred by tracking the change of the normal on a joining smooth curve, e.g. an arc of a perfect circle. A decay function as depicted, for example, in FIG. 3B, is used to weight the vote cast on the neighboring pixel.

According to embodiments, the nonsymmetric tensor voting field performs the voting operations such that an initial voting pixel casts higher votes on neighboring pixels predicted to lie, according to the intensity gradient, within the interior of a cell nucleus than on neighboring pixels being equally far apart from the voting pixel but being predicted to lie outside of the nucleus. When a particular stain is used for staining nuclei in a tissue sample, this results in a characteristic intensity gradient at the nuclear border. For example, the pixels inside a nucleus stained with this particular stain may typically have a higher intensity than pixels outside a nucleus. The tensor voting field mathematically incorporates this "knowledge" on the "typical" intensity gradient at the nuclear border by casting higher votes on neighboring pixels which lie, according to the direction of the intensity gradient of the voting pixel and according to the relative position of the voting pixel and the neighboring pixel, inside a nucleus. For example, this may be achieved by modifying the formula for calculating the vote (given in FIG. 3B) as follows (modified formula MF1):

$$S(l, \theta, \sigma) = \begin{cases} e^{-\frac{s^2 + c\mathcal{K}^2}{\sigma^2}} \begin{bmatrix} -\sin(2\theta) \\ \cos(2\theta) \end{bmatrix} [-\sin(2\theta) \ \cos(2\theta)] & \text{if } \theta \in A1 \text{ or } A2 \text{ or } A3 \\ 0 & \text{otherwise} \end{cases},$$

A1, A2 and A3 are ranges for voting angles. According to one example, the following ranges are used:

$$\text{angle range } A1 = \left[\frac{-\pi}{12}, \frac{\pi}{4}\right],$$

$$\text{angle range } A2 = \left[\frac{3\pi}{4}, \pi\right],$$

$$\text{angle range } A3 = \left[-\pi, -\frac{11\pi}{12}\right].$$

In the unit circle notation, the y-axis $$\left(\frac{\pi}{2} \leftrightarrow \frac{3\pi}{2}\right)$$

corresponds to the intensity gradient at the voting pixel and the x-axis ($\pi \leftarrow \rightarrow 0$) corresponds to the gradient normal at the voting pixel. Preferentially, the angle ranges are chosen such that the angle ranges covering pixel areas predicted to lie (with relatively high probability), according to the gradient direction of the voting pixel, on the same side as the interior of the nucleus, are larger than the angle ranges covering pixel predicted to lie on the other side of the gradient normal.

In effect, the voting pixel will cast a zero vote on the neighboring pixel unless the voting angle belongs to one of the above specified angle ranges A1-A3. This has the effect that pixels which do not lie close to an elongated gradient normal of the voting pixel will receive a zero vote, in particular if the pixel lies on the side of the gradient normal that is predicted to lie, according to the direction of the intensity gradient at the voting pixel, on the side of the gradient normal that lies outside the nucleus.

In addition, or alternatively, the nonsymmetric tensor voting field incorporates knowledge of structural features of the nuclei by implementing a constraint on the allowed curvature when calculating the vote for a particular neighboring pixel. For example, the average radius of a nucleus of a mammalian cell is about 2.5-7.5 µm. Thus, 7.5 µm may be used as an upper threshold $r_{max}$ of a radius of the type of nucleus to be identified. Accordingly, 2.5 µm may be used as a lower threshold $r_{min}$ of a radius of the type of nucleus to be identified. A lower curvature threshold $\mathcal{K}_{min}$ is calculated according to $$\mathcal{K}_{min} = \frac{1}{r_{max}}$$

and an upper curvature threshold $\mathcal{K}_{max}$ is calculated according to $$\mathcal{K}_{max} = \frac{1}{r_{min}}.$$

The formula for calculating the vote (given in FIG. 3B) may be modified as follows (modified formula MF2):

$$S(l, \theta, \sigma) = \begin{cases} e^{-\frac{s^2 + c\mathcal{K}^2}{\sigma^2}} \begin{bmatrix} -\sin(2\theta) \\ \cos(2\theta) \end{bmatrix} [-\sin(2\theta) \ \cos(2\theta)] & \text{if } \mathcal{K}_{min} \leq \mathcal{K} \leq \mathcal{K}_{max} \\ 0 & \text{otherwise} \end{cases},$$

Depending on the embodiment, it is possible to use combinations of the modified formulas MF1 and MF2. In addition or alternatively, it is possible to use a continuous decay function which casts votes which indirectly correlate with the deviation of the curvature from a "typical mean curvature" and/or which indirectly correlate with the deviation of the voting angle from a "typical angle" of two real nuclear edge pixels having the same distance as the voting and votee pixel. Thus, instead of using a discrete function, alternative embodiments may use a smooth/continuous formula for calculating the weight of the votes in dependence on the curvature and/or voting angle.

In effect, the "weight" of a vote cast on a particular neighboring pixel depends on a structural feature of the type of nucleus whose boundary is to be identified.

All votes cast on a particular votee pixel are summed up to compute a tensor sum ("tensor value") for said pixel. That tensor sum of each pixel is decomposed and analyzed in order to estimate the "sticklike-ness" of said pixel. Pixels with low saliency are assumed to be outliers.

A saliency edge image is generated in which pixels having a high saliency (a high probability of being a real edge pixel, according to the tensor voting prediction) are selectively highlighted as true edge pixels.

Although described with reference to greyscale images, the disclosed embodiments also apply to color images and other types of images such as multiplex images. For color images, a gradient may be computed within a color space, and the exemplary methods described herein may be performed in that color space to determine accurate foregrounds. Grayscale gradient images may be generated for each color channel, and operations performed accordingly. Multiplex images may be separated into component vectors prior to executing tensor voting and local threshold generation operations described herein. Moreover, the disclosed methods may be applied to any structures with a known or uniform curvature, in addition to the described nucleus.

As known to one of ordinary skill in the art, the term "domain specific knowledge" can mean that if the shapes being sought out in images are known, then that knowledge of the shapes can be applied towards the shaping of the tensor voting field, thereby making it a special kind of asymmetry.

Certain pre-computations and hardware acceleration may be performed to alleviate hardware and time expenses. For instance, votes for neighbor pixels may be pre-computed for a number of different gradient directions. An accumulation image may be parallel generated for each block of pixels. These processes may be parallel performed on the same or different regions of the image, or the entire image repeatedly, with custom regions being defined based on structures or features observed in the image, and separate operations being executed in parallel on different regions, enabling efficient processing of large numbers of slides. Moreover, besides medical applications such as anatomical or clinical pathology, prostrate/lung cancer diagnosis, etc., the same methods may be performed to analyze other types of samples such as remote sensing of geological or astronomical data, etc. Images may be further refined by eliminating known or obvious sources of noise by, for instance, being compared to known or ideal sets of signals from similar materials. For large or multiple slide/image analysis, or for analyzing one or more image cubes, the operations described herein may be ported into a hardware graphics processing unit (GPU), enabling a multi-threaded parallel implementation.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents. Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. An image processing system for digital pathology comprising a processor and a memory coupled to the processor, the memory storing a digital image of a biological tissue sample and storing computer-executable instructions that, when executed by the processor, cause the processor to perform operations for discerning a cell nucleus boundary in the digital image, said operations comprising:

identifying, by the processor, one or more initial edges in the digital image and using the pixels within the identified initial edges as initial voting pixels;

using, by the processor, a tensor voting field for performing tensor voting operations on pixels in a neighborhood of each of the initial voting pixels;

accumulating, by the processor, a plurality of votes for each of the neighboring pixels to determine a tensor value for said neighboring pixel, the amount of the vote indicating whether said neighboring pixel is likely to be an edge pixel of the same nucleus as the initial voting pixel, the tensor value being a sum of all votes cast by all initial voting pixels in whose neighborhood said neighboring pixel lies;

decomposing, by the processor, each of the determined tensor values for determining eigenvalues and eigenvectors of the decomposed tensor value;

evaluating, by the processor, the determined eigenvalues and eigenvectors for identifying refined edge pixels, the refined edge pixels representing the cell nucleus boundary; and generating, by the processor, a saliency edge strength image which selectively comprises the identified refined edge pixels representing the cell nucleus boundary.

2. The system of claim 1,
wherein the tensor voting field encodes one or more features of the nucleus;
wherein the one or more features of the nucleus comprise the information whether the typical intensity values of inner-nucleus pixels of the type of nucleus to be determined is higher or lower than the typical intensity values of outer-nucleus pixel;
wherein the tensor voting field is a nonsymmetrical tensor voting field,
wherein the tensor voting field is nonsymmetrical along an intensity gradient of the initial voting pixel whose vote is calculated; and
wherein the encoding is performed such that the calculation of a vote of an initial voting pixel by the tensor voting field comprises:
identifying, by the processor, a direction of an intensity gradient of the digital image at the initial voting pixel; and
causing the voting operations to cast higher votes on a first neighboring pixel than on a second neighboring pixel, the first and second neighboring pixels lying equally far apart from the voting pixel, wherein the first neighboring pixel lies, according to the identified direction of the intensity gradient, in the direction of the inside of the nucleus; wherein the second neighboring pixel lies, according to the identified direction of the intensity gradient, in the direction of the outside of the nucleus.

3. The system of claim 1, the evaluation of the determined eigenvalues and eigenvectors comprising determining whether the pixel for which the evaluated eigenvalues and eigenvectors was determined is an edge pixel, a junction pixel, or an outlier, the method operations further comprising:
based on the determination whether the pixel for which the evaluated eigenvalues and eigenvectors was determined is an edge pixel, a junction pixel, or an outlier, selectively highlighting the edge pixels in the saliency edge strength image.

4. The system of claim 1, wherein the tensor value determined for each pixel represents a saliency value for said pixel, the saliency value being proportional to the probability that said pixel is a member of a nuclear edge.

5. The system of claim 1,
wherein the tensor voting field is modulated by a feature of the nucleus; and
wherein the feature of the nucleus is the radius of the type of nucleus whose boundary is to be detected.

6. The system of claim 1, wherein the operations further comprise:
using the refined edge pixels for sampling foreground pixels (404) and background pixels, the foreground pixels being candidates for inner-nucleus pixels, the background pixels being candidates for outer-nucleus pixels, wherein the foreground and background pixels are sampled by selecting pixels of the digital image in the neighborhood of an identified refined edge pixel, wherein foreground pixels and background pixels are selected from different sides of the edge;
creating a foreground histogram for the intensity values of the sampled foreground pixels;
creating a background histogram for the intensity values of the sampled background pixels;
evaluating the foreground and background histograms for identifying an optimized intensity threshold value, the optimized intensity threshold value being an intensity threshold value that is capable to separate the sampled pixels in dependence on their intensity values being below or above the intensity threshold value into two separate sets of pixels such that said two separate sets of pixels have minimum deviation from the foreground and background pixel samples.

7. The system of claim 6, wherein the operations further comprise:
dividing the digital image into a plurality of sub-regions; and
performing the sampling of the foreground and background pixels and the determination of the optimized intensity threshold values for each of the plurality of sub-regions separately.

8. The system of claim 1, wherein the operations further comprise:
performing multi-response suppression on the saliency edge image and then hysteresis thresholding of the suppressed saliency edge image to produce a refined edge mask for the digital image.

9. The system of claim 1, wherein the initial edges are identified by applying a Canny edge detection filter on the initial image.

10. The system of claim 1, wherein the operations further comprise:
computing an intensity gradient in the initial image at the location of each initial voting pixel; and
analyzing the image gradients at the initial voting pixels to produce stick tensor components of the tensor value of each initial voting pixel, wherein the direction of the intensity gradient at a pixel is used as the direction of a stick tensor component at that pixel and wherein the gradient value of the intensity gradient at said pixel is used for the strength of the stick tensor component at that pixel.

11. A method for automatically discerning a cell nucleus boundary in a digital image of a biological tissue sample, the method being executed by a processor of a digital pathology image analysis system, the method comprising:
identifying, by the processor, one or more initial edges in the digital image and using the pixels within the identified initial edges as initial voting pixels;
using, by the processor, a tensor voting field for performing tensor voting operations on pixels in a neighborhood of each of the initial voting pixels;
accumulating, by the processor, a plurality of votes for each of the neighboring pixels to determine a tensor value for said neighboring pixel, the amount of the vote indicating whether said neighboring pixel is likely to be an edge pixel of the same nucleus as the initial voting pixel, the tensor value being a sum of all votes cast by all initial voting pixels in whose neighborhood said neighboring pixel lies; and
decomposing, by the processor, each of the determined tensor values for determining eigenvalues and eigenvectors of the decomposed tensor value;
evaluating, by the processor, the determined eigenvalues and eigenvectors for identifying refined edge pixels, the refined edge pixels representing the cell nucleus boundary; and
generating, by the processor, a saliency edge strength image which selectively comprises the identified refined edge pixels representing the cell nucleus boundary.

12. The method of claim 11, wherein the tensor value determined for each pixel represents a saliency value for said pixel, the saliency value being proportional to the probability that said pixel is a member of a nuclear edge.

13. The method of claim 11,
wherein the tensor voting field is modulated by a feature of the nucleus; and
wherein the feature of the nucleus is the radius of the type of nucleus whose boundary is to be detected.

14. The method of claim 11, further comprising:
performing multi-response suppression on the saliency edge image and then hysteresis thresholding of the suppressed saliency edge image to produce a refined edge mask for the digital image.

15. The method of claim 11, wherein the initial edges are identified by applying a Canny edge detection filter on the initial image.

16. A non-transitory computer-readable medium storing instructions which, when executed by one or more processors of a system, cause the system to perform a method for automatically discerning a cell nucleus boundary in a digital image of a biological tissue sample, the method comprising:
identifying one or more initial edges in the digital image and using the pixels within the identified initial edges as initial voting pixels;
using a tensor voting field for performing tensor voting operations on pixels in a neighborhood of each of the initial voting pixels;
accumulating a plurality of votes for each of the neighboring pixels to determine a tensor value for said neighboring pixel, the amount of the vote indicating whether said neighboring pixel is likely to be an edge pixel of the same nucleus as the initial voting pixel, the tensor value being a sum of all votes cast by all initial voting pixels in whose neighborhood said neighboring pixel lies; and
decomposing each of the determined tensor values for determining eigenvalues and eigenvectors of the decomposed tensor value;
evaluating the determined eigenvalues and eigenvectors for identifying refined edge pixels, the refined edge pixels representing the cell nucleus boundary; and
generating a saliency edge strength image which selectively comprises the identified refined edge pixels representing the cell nucleus boundary.

17. The non-transitory computer-readable medium of claim 16, wherein the tensor value determined for each pixel represents a saliency value for said pixel, the saliency value being proportional to the probability that said pixel is a member of a nuclear edge.

18. The non-transitory computer-readable medium of claim 16,
wherein the tensor voting field is modulated by a feature of the nucleus; and
wherein the feature of the nucleus is the radius of the type of nucleus whose boundary is to be detected.

19. The non-transitory computer-readable medium of claim 16, wherein the method further comprises:
performing multi-response suppression on the saliency edge image and then hysteresis thresholding of the suppressed saliency edge image to produce a refined edge mask for the digital image.

20. The non-transitory computer-readable medium of claim 16, wherein the initial edges are identified by applying a Canny edge detection filter on the initial image.

* * * * *